United States Patent
Herath et al.

(10) Patent No.: US 12,335,026 B2
(45) Date of Patent: Jun. 17, 2025

(54) MULTIPLE ACCESS IN BACKSCATTER COMMUNICATION SYSTEMS

(71) Applicant: HUAWEI TECHNOLOGIES CO., LTD., Guangdong (CN)

(72) Inventors: Sanjeewa Herath, Kanata (CA); Javad Abdoli, Kanata (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 310 days.

(21) Appl. No.: 17/973,685

(22) Filed: Oct. 26, 2022

(65) Prior Publication Data
US 2024/0146408 A1    May 2, 2024

Related U.S. Application Data

(63) Continuation of application No. PCT/CN2021/088542, filed on Apr. 20, 2021.

(51) Int. Cl.
*H04B 7/22* (2006.01)
*H04W 76/28* (2018.01)

(52) U.S. Cl.
CPC .............. *H04B 7/22* (2013.01); *H04W 76/28* (2018.02)

(58) Field of Classification Search
CPC  H04B 7/00; H04B 7/22; H04B 7/145; H04W 76/00; H04W 76/20; H04W 76/28;
(Continued)

(56) References Cited

U.S. PATENT DOCUMENTS 6,084,530 A  *  7/2000  Pidwerbetsky ...... G06K 7/0008
                                                    342/51
11,184,057 B2 * 11/2021  Jung .................... H04B 7/0617
(Continued)

FOREIGN PATENT DOCUMENTS

CN        109412992 A      3/2019
CN        112039744 A     12/2020
(Continued)

OTHER PUBLICATIONS

Vamsi Talla, Mehrdad Hessar, Bryce Kellogg, Ali Najafi, Joshua R. Smith and Shyamnath Gollakota. 2017. "LoRa Backscatter: Enabling The Vision of Ubiquitous Connectivity". Proc. ACM Interact. Mob. Wearable Ubiquitous Technol. 1, Article 105, Sep. 2017.
(Continued)

*Primary Examiner* — Warner Wong
(74) *Attorney, Agent, or Firm* — Slater Matsil, LLP

(57) ABSTRACT

A backscatter transmission scheme is provided in which a carrier signal is transmitted by a carrier communication device discontinuously as carrier signal bursts. The carrier signal, while it is on, is divided into carrier time segments. Each carrier time segment has a specified time. The different carrier time segments represent different times that backscatter devices can make backscatter transmissions. In addition, in some embodiments, a set of frequencies are available for backscatter transmission. The set of frequencies includes the carrier frequency and a set of frequencies with respective frequency shifts relative to the carrier frequency. The combination of a specific carrier time segment, a specific frequency shift, together constitutes a specific backscatter transmission opportunity.

20 Claims, 17 Drawing Sheets

(58) Field of Classification Search
CPC ..... H04W 88/00; H04W 99/00; H04W 74/00; H04W 72/04; H04W 72/50; H04L 25/00–03343; H04L 2025/03356
See application file for complete search history.

(56) References Cited

U.S. PATENT DOCUMENTS

| | | | | |
|---|---|---|---|---|
| 11,722,347 | B2* | 8/2023 | Rosenthal | H04L 5/0007 375/262 |
| 2002/0035505 | A1* | 3/2002 | Ho | H04L 27/32 705/13 |
| 2004/0155634 | A1* | 8/2004 | Sasaki | H01G 11/14 323/263 |
| 2005/0052279 | A1* | 3/2005 | Bridgelall | G06K 19/0724 340/10.1 |
| 2016/0365890 | A1* | 12/2016 | Reynolds | H04B 1/525 |
| 2018/0375703 | A1* | 12/2018 | Kellogg | H04L 27/34 |
| 2019/0089571 | A1* | 3/2019 | Von Novak, III | H04L 1/0003 |
| 2020/0212956 | A1* | 7/2020 | Gollakota | H04B 1/40 |
| 2020/0412591 | A1* | 12/2020 | Lopez | H04L 27/2628 |
| 2021/0084251 | A1* | 3/2021 | Gollakota | H04N 5/40 |
| 2021/0250868 | A1* | 8/2021 | Ma | H04B 1/38 |
| 2022/0159671 | A1* | 5/2022 | Kim | H04W 72/0453 |
| 2022/0217640 | A1* | 7/2022 | Ma | H04B 1/38 |
| 2022/0278886 | A1* | 9/2022 | Yan | H04B 7/026 |
| 2023/0119392 | A1* | 4/2023 | Wang | H04B 5/77 370/311 |
| 2023/0179239 | A1* | 6/2023 | Lopez | H04B 5/45 455/114.2 |

FOREIGN PATENT DOCUMENTS

| | | | |
|---|---|---|---|
| CN | 112468225 A | 3/2021 | |
| CN | 118590135 * | 9/2024 | ............... H04B 7/22 |
| EP | 0779520 A2 | 6/1997 | |
| WO | 2017132400 A1 | 8/2017 | |

OTHER PUBLICATIONS

R. Correia, A. Boaventura and N. Borges Carvalho, "Quadrature Amplitude Backscatter Modulator for Passive Wireless Sensors in IoT Applications," in IEEE Transactions on Microwave Theory and Techniques, vol. 65, No. 4, pp. 1103-1110, Apr. 2017.

Technical Specification Group Radio Access Network; Study on Non-Orthogonal Multiple Access (NOMA) for NR (Release 16), 3GPP TR 38.812 V16.0.0.

* cited by examiner

MULTIPLE ACCESS IN BACKSCATTER COMMUNICATION SYSTEMS

CROSS-REFERENCE TO RELATED APPLICATION

This application is a continuation of pct international patent application no. PCT/CN2021/088542 filed Apr. 20, 2021, which is hereby incorporated by reference.

FIELD

The application relates to wireless communications generally, and more specifically to backscatter communication systems.

BACKGROUND

Backscatter communication systems have been proposed as a transmission technique for low-cost devices and find many applications in internet of things (IoT), industrial IoT, farm environment, smart homes etc. In a regular device, information bits are modulated to constellation symbols and such modulated symbols are carried by a carrier signal generated at the transmitting device. As such, the modulated symbols are passed through waveform related operations and transmitting devices can support waveforms such as cyclic prefix-orthogonal frequency division multiplexing (CP-OFDM), discrete Fourier transform-spread-OFDM (DFT-s-OFDM). These waveforms are produced or passed through one or more blocks such as an amplifier, digital-to-analog conversion (DAC), filters (e.g. low-pass and band-pass filters), and up-conversion to generate a radio frequency (RF) signal for emission by the device antennas. Most of these blocks consume power from the device, usually made available by a battery supply. As such the devices are considered active devices which means that the signal emitted from the device is being generated within the device by using circuits/components and integrated circuits (ICs) that are powered by an internal power supply. Such a device has the flexibility to generate a signal within the operating frequency band. For example, a user equipment (UE) that supports New Radio (NR)/Long Term Evolution (LTE), operating in 10 MHz carrier, that is assigned a bandwidth part (BWP) within the carrier, can generate a signal based on the BWP configuration. The BWP configuration may be received by the UE from a base station (BS)/gNodeB. Control signaling (for example, received through physical downlink control channel (PDCCH)) provides the required signaling information regarding the signal generation. A UE may support multiple signaling mechanisms such downlink control information (DCI), radio resource control (RRC), MAC-CE (medium access control-control element).

Unlike the regular UE device described above which can be considered an active device, a backscatter device is a limited capability device which cannot generate its own carrier signal bearing the information signal. A backscatter device may not require one or more of devices/components such as power amplifier, D/A converters, up-converters which are used by active devices. Because a backscatter device utilizes an external carrier signal to modulate its data, it can be considered a passive device from a carrier signal generation point of view. As a result, a backscatter device can be low-cost and can operate with low power consumption, at least in comparison to an active device.

SUMMARY

A backscatter transmission scheme is provided in which a carrier signal is transmitted by a carrier communication device discontinuously as carrier signal bursts. The carrier signal, while it is on, is divided into carrier time segments. Each carrier time segment has a specified time offset from the beginning, also referred to as a start time, of the carrier signal burst. The different carrier time segments represent different times that backscatter devices can make backscatter transmissions. In addition, in some embodiments, a set of frequencies are available for backscatter transmission. The set of frequencies includes the carrier frequency and a set of frequencies with respective frequency shifts relative to the carrier frequency. In addition, in some embodiments, a set of spreading (which may be sparse or non-sparse spreading) and/or scrambling codes are available for backscatter transmission. The combination of a specific carrier time segment, a specific frequency shift and a specific spreading/scrambling code, when used, together constitutes a specific backscatter transmission opportunity, also referred to herein as a transmission unit (TU) and a backscatter transmission channel.

Each backscatter device transmits using a pre-assigned backscatter transmission opportunity, such that it transmits during a pre-assigned carrier time segment, using a pre-assigned frequency shift from the received carrier signal frequency. In embodiments that include spreading or scrambling, each backscatter device transmits a pre-assigned spreading or scrambling code.

In some embodiments, where linear or non-linear spreading and/or scrambling is performed, the alphabet of the spread/scrambled symbol sequence is restricted to the constellation symbol alphabet. This is referred to herein as restricted symbol spreading/scrambling. An advantage of this approach is that spreading/scrambling can be accommodated without increasing the number of impedances in a load modulator.

According to one aspect of the present disclosure, there is provided a method that involves a backscatter device receiving a carrier signal from a carrier communication device. The carrier signal has a start time. The backscatter device produces a backscatter carrier signal from the received carrier signal. At a time offset relative to the start time, the backscatter device generates a backscattered signal by modulating data using the backscatter carrier signal and transmits the backscattered signal using a transmission resource. The time offset is predefined and at least in part defines a time segment of the transmission resource.

An advantage of this approach is that by using predefined time offsets, the likelihood of backscatter transmission collision is reduced, and no signalling is required to dynamically convey the preassigned offsets.

In some embodiments, the backscatter device produces a backscatter carrier signal from the received carrier signal by applying a frequency shift to the received carrier signal, the frequency shift being one of a set of possible frequency shifts. The set of possible frequency shifts includes a zero frequency shift. The frequency shift is predefined and at least in part defines the transmission resource.

An advantage of this approach is that by using preassigned time offsets and also a predefined frequency shift, the likelihood of backscatter transmission collision is reduced, and no signalling is required to dynamically convey the preassigned offsets.

In some embodiments, modulating data involves performing load modulation.

In some embodiments, generating the backscattered signal involves performing scrambling of symbols output by the modulating data using a scrambling sequence. A symbol alphabet of symbols output by scrambling is the same as a symbol alphabet of symbols output of said modulating data. The scrambling sequence is predefined and at least in part defines the transmission resource to be used by the backscatter device.

In some embodiments, the modulating data and the scrambling are performed in a single step using a load modulator.

An advantage of using scrambling is that the scrambling randomizes interference improving the data detection, demodulation and decoding performance, in that the number of backscatter transmission opportunities is increased. An advantage of restricting the symbol output of scrambling to be the same as the output of modulation is that no addition complexity is added in the modulation stage. For example, the number of impedances in a load modulator need not be increased due to the inclusion of the scrambling step.

In some embodiments, generating the backscattered signal involves performing spreading of symbols output by said modulating data using a spreading sequence. A symbol alphabet of symbols output by spreading is the same as a symbol alphabet of symbols output by modulating data. The spreading sequence is predefined and at least in part defines the transmission resource.

An advantage of using spreading is that spreading allows multi-user separation using a spreading sequence, in that the number of backscatter transmission opportunities is increased. An advantage of restricting the symbol output of spreading to be the same as the output of modulation is that no addition complexity is added in the modulation stage. For example, the number of impedances in a load modulator need not be increased due to the inclusion of the spreading step.

In some embodiments, the modulating and the spreading are performed in a single step using a load modulator.

In some embodiments, the method of further involves the backscatter device using a resistive impedance in the load modulation to generate a zero output to achieve sparse spreading in the output of load modulation.

An advantage of this approach is that sparse spreading is introduced with only a very small increase in complexity, namely the introduction of a single resistive impedance. The inclusion of sparse spreading also helps interference control and hence better detection, demodulation, data decoding under backscatter transmissions collisions.

In some embodiments, the method of further involves the backscatter device performing charging of a battery of the backscatter device using the received carrier signal during a time that does not overlap with the time segment of the transmission resource.

An advantage of this approach is that very simple backscatter devices can be implemented that are able to charge and transmit, but need not be able to charge and transmit at the same time. With this approach, there is no overlap between the two tasks.

In some embodiments, the method of further involves the backscatter device performing data reception using the received carrier signal during a time that does not overlap with the time segment of the transmission resource.

According to another aspect of the present disclosure, there is provided an apparatus that has a processor and a memory. The apparatus is configured to implement a method that involves receiving a carrier signal from a carrier communication device, the carrier signal having a start time. The method further involves producing a backscatter carrier signal from the received carrier signal. The method further involves at a time offset relative to the start time, generating a backscattered signal by modulating data using the backscatter carrier signal, and transmitting the backscattered signal using a transmission resource. The time offset is predefined and at least in part defines a time segment of the transmission resource.

In some embodiments, producing a backscatter carrier signal from the received carrier signal involves applying a frequency shift to the received carrier signal, the frequency shift being one of a set of possible frequency shifts. The set of possible frequency shifts includes a zero frequency shift i.e., the backscattered signal and received carrier signal are in the same frequency. The frequency shift is predefined and at least in part defines the transmission resource.

In some embodiments, the apparatus has a load modulator. In this case, modulating the data is performed using the load modulator.

In some embodiments, generating the backscattered signal involves performing scrambling of symbols output by said modulating data using a scrambling sequence. A symbol alphabet of symbols output by scrambling is the same as a symbol alphabet of symbols output of said modulating data. The scrambling sequence is predefined.

In some embodiments, the apparatus has a load modulator, and the modulating data and the scrambling are performed in a single step using the load modulator.

In some embodiments, generating the backscattered signal involves performing spreading of symbols output by said modulating data using a spreading sequence. A symbol alphabet of symbols output by spreading is the same as a symbol alphabet of symbols output by modulating data. The spreading sequence is predefined.

In some embodiments, the apparatus has a load modulator, and the modulating and the spreading are performed in a single step using the load modulator.

In some embodiments, the apparatus is further configured to perform sparse spreading by using a resistive impedance in the load modulation to generate a zero output to achieve sparse spreading in the output of the load modulator.

In some embodiments, the apparatus is further configured to perform charging of a battery of the backscatter device using the received carrier signal during a time that does not overlap with the time segment of the transmission resource.

In some embodiments, the apparatus is further configured to perform data reception using the received carrier during a time that does not overlap with the time segment of the transmission resource.

BRIEF DESCRIPTION OF THE DRAWINGS

Embodiments of the disclosure will now be described with reference to the attached drawings in which.

DETAILED DESCRIPTION

The operation of the current example embodiments and the structure thereof are discussed in detail below. It should be appreciated, however, that the present disclosure provides many applicable inventive concepts that can be embodied in any of a wide variety of specific contexts. The specific embodiments discussed are merely illustrative of specific structures of the disclosure and ways to operate the disclosure, and do not limit the scope of the present disclosure.

Figure 1A:
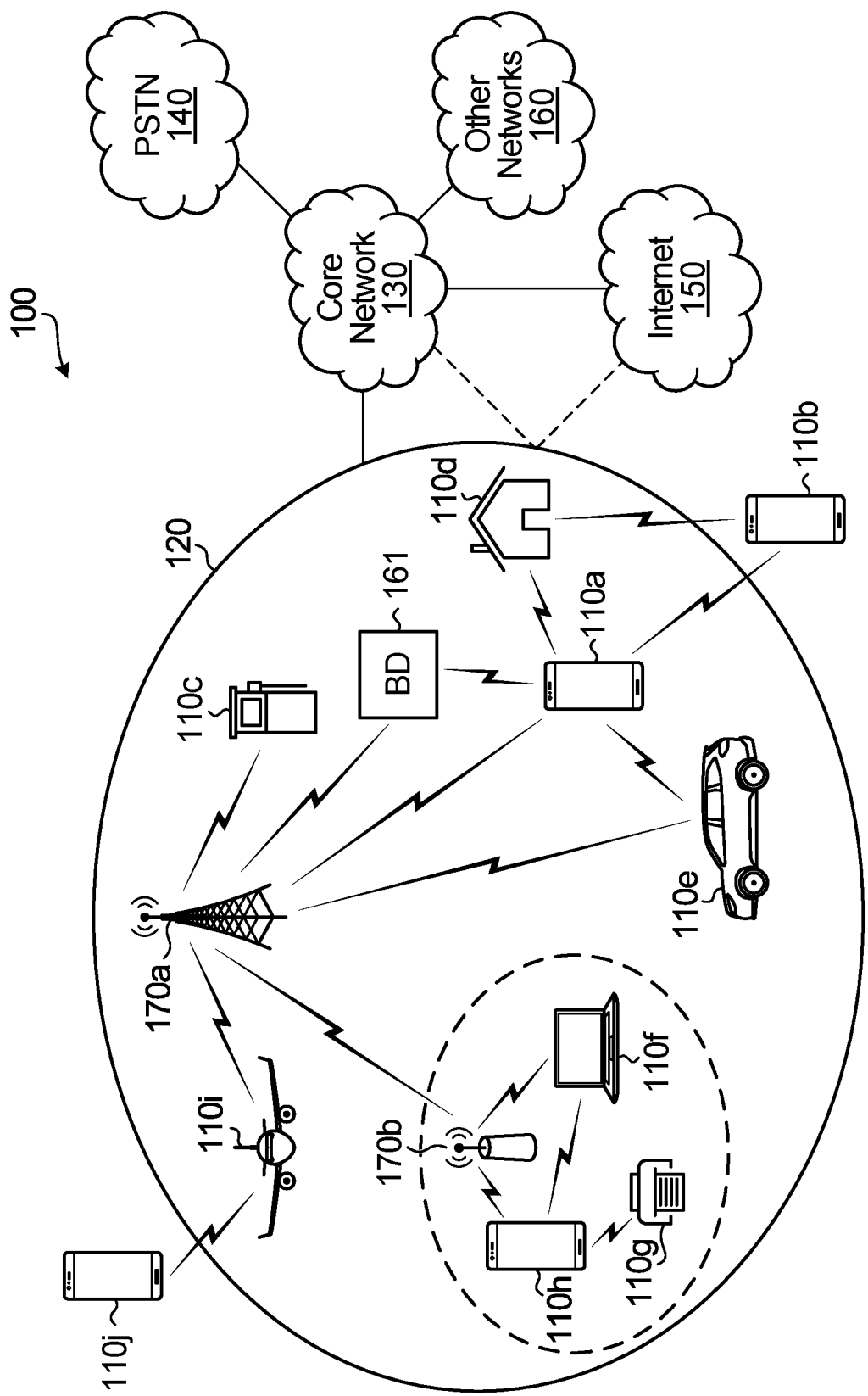
FIG. 1A is a block diagram of a communication system.

Referring to FIG. 1A, as an illustrative example without limitation, a simplified schematic illustration of a communication system is provided. The communication system 100 comprises a radio access network 120. The radio access network 120 may be a next generation (e.g. sixth generation (6G) or later) radio access network, or a legacy (e.g. 5G, 4G, 3G or 2G) radio access network. One or more communication electric device (ED) 110a-120j (generically referred to as 110) may be interconnected to one another or connected to one or more network nodes (170a, 170b, generically referred to as 170) in the radio access network 120. A core network 130 may be a part of the communication system and may be dependent or independent of the radio access technology used in the communication system 100. Also the communication system 100 comprises a public switched telephone network (PSTN) 140, the internet 150, and other networks 160. Also shown is a backscatter device (BD) 161 which receives a carrier from network node 170a, and transmits a backscattered signal that is received by ED 110a. FIG. 3 described below is a block diagram of an example backscatter device. The backscatter device 161 transmits a backscattered signal using a preassigned resource as described in detail below. In some embodiments, the network node 170a is configured to transmit a carrier or carriers for use with a pre-assigned resource grid for backscatter multiple access communication, as detailed below. In the illustrated example, an ED 110a is the receiver of the backscatter signal, but any node in the network can function as such. In the illustrated example, the network node 170a functions as the carrier communication device, and emits a carrier for use by the backscatter device. More generally, the carrier communication device can be any node that transmits a carrier, and is external to the backscatter device 161.

Figure 1B:
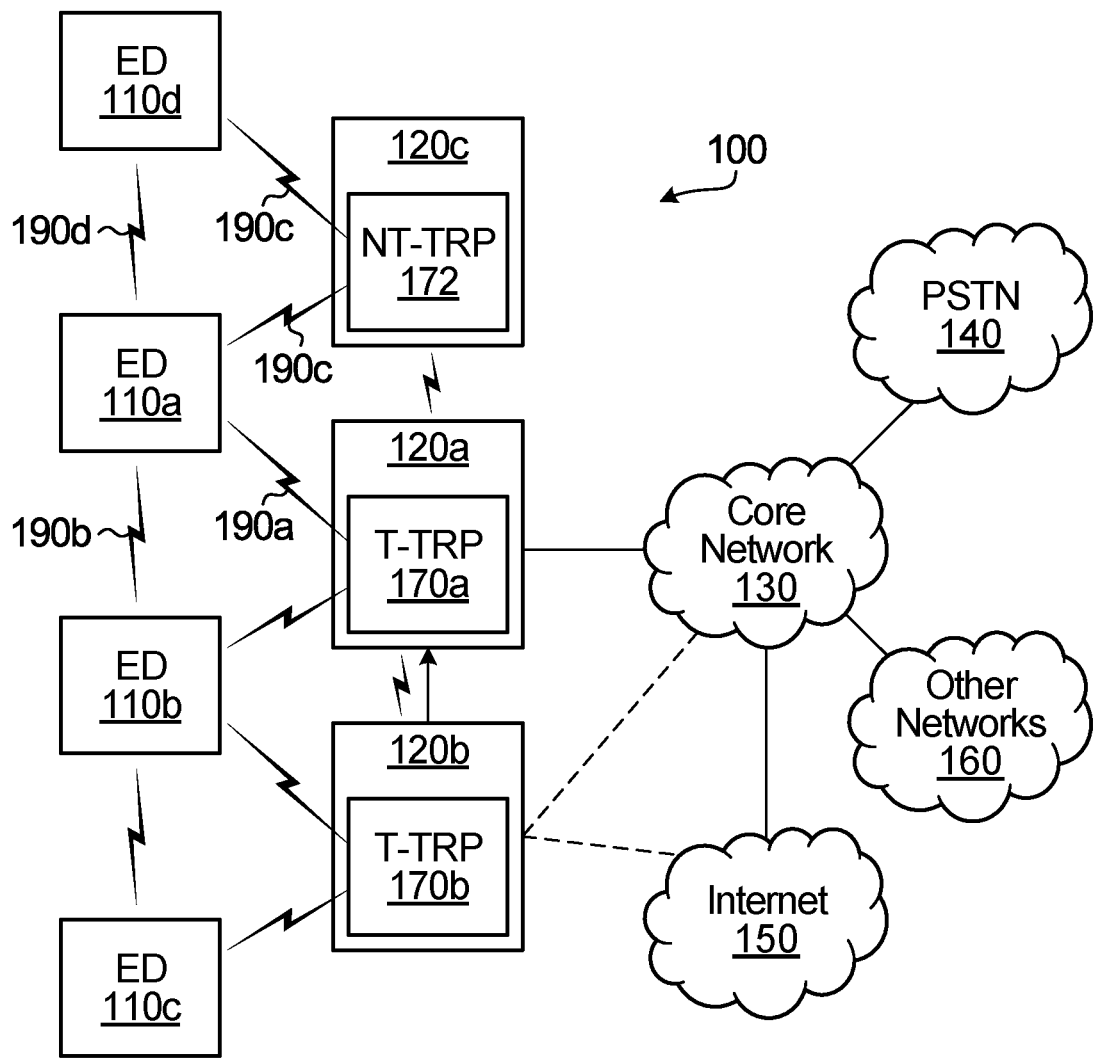
FIG. 1B is a block diagram of a communication system.

FIG. 1B illustrates an example communication system 100. In general, the communication system 100 enables multiple wireless or wired elements to communicate data and other content. The purpose of the communication system 100 may be to provide content, such as voice, data, video, and/or text, via broadcast, multicast and unicast, etc. The communication system 100 may operate by sharing resources, such as carrier spectrum bandwidth, between its constituent elements. The communication system 100 may include a terrestrial communication system and/or a non-terrestrial communication system. The communication system 100 may provide a wide range of communication services and applications (such as earth monitoring, remote sensing, passive sensing and positioning, navigation and tracking, autonomous delivery and mobility, etc.). The communication system 100 may provide a high degree of availability and robustness through a joint operation of the terrestrial communication system and the non-terrestrial communication system. For example, integrating a non-terrestrial communication system (or components thereof) into a terrestrial communication system can result in what may be considered a heterogeneous network comprising multiple layers. Compared to conventional communication networks, the heterogeneous network may achieve better overall performance through efficient multi-link joint operation, more flexible functionality sharing, and faster physical layer link switching between terrestrial networks and non-terrestrial networks.

The terrestrial communication system and the non-terrestrial communication system could be considered sub-systems of the communication system. In the example shown, the communication system 100 includes electronic devices (ED) 110a-110d (generically referred to as ED 110), radio access networks (RANs) 120a-120b, non-terrestrial communication network 120c, a core network 130, a public switched telephone network (PSTN) 140, the internet 150, and other networks 160. The RANs 120a-120b include respective base stations (BSs) 170a-170b, which may be generically referred to as terrestrial transmit and receive points (T-TRPs) 170a-170b. The non-terrestrial communication network 120c includes an access node 120c, which may be generically referred to as a non-terrestrial transmit and receive point (NT-TRP) 172.

Any ED 110 may be alternatively or additionally configured to interface, access, or communicate with any other T-TRP 170a-170b and NT-TRP 172, the internet 150, the core network 130, the PSTN 140, the other networks 160, or any combination of the preceding. In some examples, ED 110a may communicate an uplink and/or downlink transmission over an interface 190a with T-TRP 170a. In some examples, the EDs 110a, 110b and 110d may also communicate directly with one another via one or more sidelink air interfaces 190b. In some examples, ED 110d may communicate an uplink and/or downlink transmission over an interface 190c with NT-TRP 172.

The air interfaces 190a and 190b may use similar communication technology, such as any suitable radio access technology. For example, the communication system 100 may implement one or more channel access methods, such as code division multiple access (CDMA), time division multiple access (TDMA), frequency division multiple access (FDMA), orthogonal FDMA (OFDMA), or single-carrier FDMA (SC-FDMA) in the air interfaces 190a and 190b. The air interfaces 190a and 190b may utilize other higher dimension signal spaces, which may involve a combination of orthogonal and/or non-orthogonal dimensions.

The air interface 190c can enable communication between the ED 110d and one or multiple NT-TRPs 172 via a wireless link or simply a link. For some examples, the link is a dedicated connection for unicast transmission, a connection for broadcast transmission, or a connection between a group of EDs and one or multiple NT-TRPs for multicast transmission.

The RANs 120a and 120b are in communication with the core network 130 to provide the EDs 110a 110b, and 110c with various services such as voice, data, and other services. The RANs 120a and 120b and/or the core network 130 may be in direct or indirect communication with one or more other RANs (not shown), which may or may not be directly served by core network 130, and may or may not employ the same radio access technology as RAN 120a, RAN 120b or both. The core network 130 may also serve as a gateway access between (i) the RANs 120a and 120b or EDs 110a 110b, and 110c or both, and (ii) other networks (such as the PSTN 140, the internet 150, and the other networks 160). In addition, some or all of the EDs 110a 110b, and 110c may include functionality for communicating with different wireless networks over different wireless links using different wireless technologies and/or protocols. Instead of wireless communication (or in addition thereto), the EDs 110a 110b, and 110c may communicate via wired communication channels to a service provider or switch (not shown), and to the internet 150. PSTN 140 may include circuit switched telephone networks for providing plain old telephone service (POTS). Internet 150 may include a network of computers and subnets (intranets) or both, and incorporate protocols, such as Internet Protocol (IP), Transmission Control Protocol (TCP), User Datagram Protocol (UDP). EDs 110a 110b, and 110c may be multimode devices capable of operation according to multiple radio access technologies, and incorporate multiple transceivers necessary to support such.

Figure 1C:
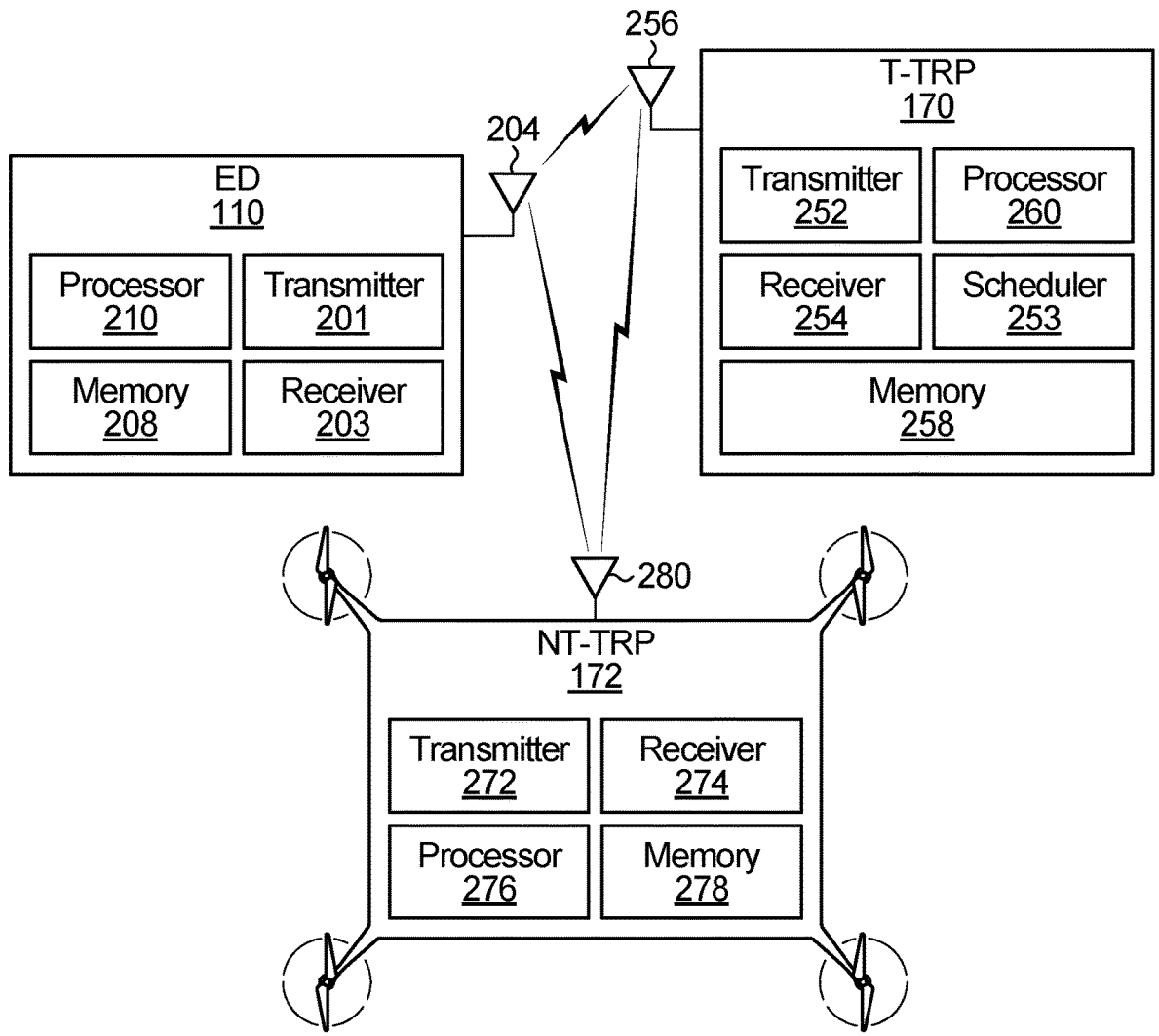
FIG. 1C is a block diagram of a communication system showing a basic component structure of an electronic device (ED) and a base station.

FIG. 1C illustrates another example of an ED 110 and a base station 170a, 170b and/or 170c. The ED 110 is used to connect persons, objects, machines, etc. The ED 110 may be widely used in various scenarios, for example, cellular communications, device-to-device (D2D), vehicle to everything (V2X), peer-to-peer (P2P), machine-to-machine (M2M), machine-type communications (MTC), internet of things (IOT), virtual reality (VR), augmented reality (AR), industrial control, self-driving, remote medical, smart grid, smart furniture, smart office, smart wearable, smart transportation, smart city, drones, robots, remote sensing, passive sensing, positioning, navigation and tracking, autonomous delivery and mobility, etc.

Each ED 110 represents any suitable end user device for wireless operation and may include such devices (or may be referred to) as a user equipment/device (UE), a wireless transmit/receive unit (WTRU), a mobile station, a fixed or mobile subscriber unit, a cellular telephone, a station (STA), a machine type communication (MTC) device, a personal digital assistant (PDA), a smartphone, a laptop, a computer, a tablet, a wireless sensor, a consumer electronics device, a smart book, a vehicle, a car, a truck, a bus, a train, or an IoT device, an industrial device, or apparatus (e.g. communication module, modem, or chip) in the forgoing devices, among other possibilities. Future generation EDs 110 may be referred to using other terms. The base station 170a and 170b is a T-TRP and will hereafter be referred to as T-TRP 170. Also shown in FIG. 3, a NT-TRP will hereafter be referred to as NT-TRP 172. Each ED 110 connected to T-TRP 170 and/or NT-TRP 172 can be dynamically or semi-statically turned-on (i.e., established, activated, or enabled), turned-off (i.e., released, deactivated, or disabled) and/or configured in response to one of more of: connection availability and connection necessity.

The ED 110 includes a transmitter 201 and a receiver 203 coupled to one or more antennas 204. Only one antenna 204 is illustrated. One, some, or all of the antennas may alternatively be panels. The transmitter 201 and the receiver 203 may be integrated, e.g. as a transceiver. The transceiver is configured to modulate data or other content for transmission by at least one antenna 204 or network interface controller (NIC). The transceiver is also configured to demodulate data or other content received by the at least one antenna 204. Each transceiver includes any suitable structure for generating signals for wireless or wired transmission and/or processing signals received wirelessly or by wire. Each antenna 204 includes any suitable structure for transmitting and/or receiving wireless or wired signals.

The ED 110 includes at least one memory 208. The memory 208 stores instructions and data used, generated, or collected by the ED 110. For example, the memory 208 could store software instructions or modules configured to implement some or all of the functionality and/or embodiments described herein and that are executed by the processing unit(s) 210. Each memory 208 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, on-processor cache, and the like.

The ED 110 may further include one or more input/output devices (not shown) or interfaces (such as a wired interface to the internet 150 in FIG. 1). The input/output devices permit interaction with a user or other devices in the network. Each input/output device includes any suitable structure for providing information to or receiving information from a user, such as a speaker, microphone, keypad, keyboard, display, or touch screen, including network interface communications.

The ED 110 further includes a processor 210 for performing operations including those related to preparing a transmission for uplink transmission to the NT-TRP 172 and/or T-TRP 170, those related to processing downlink transmissions received from the NT-TRP 172 and/or T-TRP 170, and those related to processing sidelink transmission to and from another ED 110. Processing operations related to preparing a transmission for uplink transmission may include operations such as encoding, modulating, transmit beamforming, and generating symbols for transmission. Processing operations related to processing downlink transmissions may include operations such as receive beamforming, demodulating and decoding received symbols. Depending upon the embodiment, a downlink transmission may be received by the receiver 203, possibly using receive beamforming, and the processor 210 may extract signaling from the downlink transmission (e.g. by detecting and/or decoding the signaling). An example of signaling may be a reference signal transmitted by NT-TRP 172 and/or T-TRP 170. In some embodiments, the processor 276 implements the transmit beamforming and/or receive beamforming based on the indication of beam direction, e.g. beam angle information (BAI), received from T-TRP 170. In some embodiments, the processor 210 may perform operations relating to network access (e.g. initial access) and/or downlink synchronization, such as operations relating to detecting a synchronization sequence, decoding and obtaining the system information, etc. In some embodiments, the processor 210 may perform channel estimation, e.g. using a reference signal received from the NT-TRP 172 and/or T-TRP 170.

Although not illustrated, the processor 210 may form part of the transmitter 201 and/or receiver 203. Although not illustrated, the memory 208 may form part of the processor 210.

The processor 210, and the processing components of the transmitter 201 and receiver 203 may each be implemented by the same or different one or more processors that are configured to execute instructions stored in a memory (e.g. in memory 208). Alternatively, some or all of the processor 210, and the processing components of the transmitter 201 and receiver 203 may be implemented using dedicated circuitry, such as a programmed field-programmable gate array (FPGA), a graphical processing unit (GPU), or an application-specific integrated circuit (ASIC).

The T-TRP 170 may be known by other names in some implementations, such as a base station, a base transceiver station (BTS), a radio base station, a network node, a network device, a device on the network side, a transmit/receive node, a Node B, an evolved NodeB (eNodeB or eNB), a Home eNodeB, a next Generation NodeB (gNB), a transmission point (TP)), a site controller, an access point (AP), or a wireless router, a relay station, a remote radio head, a terrestrial node, a terrestrial network device, or a terrestrial base station, base band unit (BBU), remote radio unit (RRU), active antenna unit (AAU), remote radio head (RRH), central unit (CU), distribute unit (DU), positioning node, among other possibilities. The T-TRP 170 may be macro BSs, pico BSs, relay node, donor node, or the like, or combinations thereof. The T-TRP 170 may refer to the forging devices or apparatus (e.g. communication module, modem, or chip) in the forgoing devices.

In some embodiments, the parts of the T-TRP 170 may be distributed. For example, some of the modules of the T-TRP 170 may be located remote from the equipment housing the antennas of the T-TRP 170, and may be coupled to the equipment housing the antennas over a communication link (not shown) sometimes known as front haul, such as common public radio interface (CPRI). Therefore, in some embodiments, the term T-TRP 170 may also refer to modules on the network side that perform processing operations, such as determining the location of the ED 110, resource allocation (scheduling), message generation, and encoding/decoding, and that are not necessarily part of the equipment housing the antennas of the T-TRP 170. The modules may also be coupled to other T-TRPs. In some embodiments, the T-TRP 170 may actually be a plurality of T-TRPs that are operating together to serve the ED 110, e.g. through coordinated multipoint transmissions.

The T-TRP 170 includes at least one transmitter 252 and at least one receiver 254 coupled to one or more antennas 256. Only one antenna 256 is illustrated. One, some, or all of the antennas may alternatively be panels. The transmitter 252 and the receiver 254 may be integrated as a transceiver. The T-TRP 170 further includes a processor 260 for performing operations including those related to: preparing a transmission for downlink transmission to the ED 110, processing an uplink transmission received from the ED 110, preparing a transmission for backhaul transmission to NT-TRP 172, and processing a transmission received over backhaul from the NT-TRP 172. Processing operations related to preparing a transmission for downlink or backhaul transmission may include operations such as encoding, modulating, precoding (e.g. MIMO precoding), transmit beamforming, and generating symbols for transmission. Processing operations related to processing received transmissions in the uplink or over backhaul may include operations such as receive beamforming, and demodulating and decoding received symbols. The processor 260 may also perform operations relating to network access (e.g. initial access) and/or downlink synchronization, such as generating the content of synchronization signal blocks (SSBs), generating the system information, etc. In some embodiments, the processor 260 also generates the indication of beam direction, e.g. BAI, which may be scheduled for transmission by scheduler 253. The processor 260 performs other network-side processing operations described herein, such as determining the location of the ED 110, determining where to deploy NT-TRP 172, etc. In some embodiments, the processor 260 may generate signaling, e.g. to configure one or more parameters of the ED 110 and/or one or more parameters of the NT-TRP 172. Any signaling generated by the processor 260 is sent by the transmitter 252. Note that "signaling", as used herein, may alternatively be called control signaling. Dynamic signaling may be transmitted in a control channel, e.g. a physical downlink control channel (PDCCH), and static or semi-static higher layer signaling may be included in a packet transmitted in a data channel, e.g. in a physical downlink shared channel (PDSCH).

A scheduler 253 may be coupled to the processor 260. The scheduler 253 may be included within or operated separately from the T-TRP 170, which may schedule uplink, downlink, and/or backhaul transmissions, including issuing scheduling grants and/or configuring scheduling-free ("configured grant") resources. The T-TRP 170 further includes a memory 258 for storing information and data. The memory 258 stores instructions and data used, generated, or collected by the T-TRP 170. For example, the memory 258 could store software instructions or modules configured to implement some or all of the functionality and/or embodiments described herein and that are executed by the processor 260.

Although not illustrated, the processor 260 may form part of the transmitter 252 and/or receiver 254. Also, although not illustrated, the processor 260 may implement the scheduler 253. Although not illustrated, the memory 258 may form part of the processor 260.

The processor 260, the scheduler 253, and the processing components of the transmitter 252 and receiver 254 may each be implemented by the same or different one or more processors that are configured to execute instructions stored in a memory, e.g. in memory 258. Alternatively, some or all of the processor 260, the scheduler 253, and the processing components of the transmitter 252 and receiver 254 may be implemented using dedicated circuitry, such as a FPGA, a GPU, or an ASIC.

Although the NT-TRP 172 is illustrated as a drone only as an example, the NT-TRP 172 may be implemented in any suitable non-terrestrial form. Also, the NT-TRP 172 may be known by other names in some implementations, such as a non-terrestrial node, a non-terrestrial network device, or a non-terrestrial base station. The NT-TRP 172 includes a transmitter 272 and a receiver 274 coupled to one or more antennas 280. Only one antenna 280 is illustrated. One, some, or all of the antennas may alternatively be panels. The transmitter 272 and the receiver 274 may be integrated as a transceiver. The NT-TRP 172 further includes a processor 276 for performing operations including those related to: preparing a transmission for downlink transmission to the ED 110, processing an uplink transmission received from the ED 110, preparing a transmission for backhaul transmission to T-TRP 170, and processing a transmission received over backhaul from the T-TRP 170. Processing operations related to preparing a transmission for downlink or backhaul transmission may include operations such as encoding, modulating, precoding (e.g. MIMO precoding), transmit beamforming, and generating symbols for transmission. Processing operations related to processing received transmissions in the uplink or over backhaul may include operations such as receive beamforming, and demodulating and decoding received symbols. In some embodiments, the processor 276 implements the transmit beamforming and/or receive beamforming based on beam direction information (e.g. BAI) received from T-TRP 170. In some embodiments, the processor 276 may generate signaling, e.g. to configure one or more parameters of the ED 110. In some embodiments, the NT-TRP 172 implements physical layer processing, but does not implement higher layer functions such as functions at the medium access control (MAC) or radio link control (RLC) layer. As this is only an example, more generally, the NT-TRP 172 may implement higher layer functions in addition to physical layer processing.

The NT-TRP 172 further includes a memory 278 for storing information and data. Although not illustrated, the processor 276 may form part of the transmitter 272 and/or receiver 274. Although not illustrated, the memory 278 may form part of the processor 276.

The processor 276 and the processing components of the transmitter 272 and receiver 274 may each be implemented by the same or different one or more processors that are configured to execute instructions stored in a memory, e.g. in memory 278. Alternatively, some or all of the processor 276 and the processing components of the transmitter 272 and receiver 274 may be implemented using dedicated circuitry, such as a programmed FPGA, a GPU, or an ASIC. In some embodiments, the NT-TRP 172 may actually be a plurality of NT-TRPs that are operating together to serve the ED 110, e.g. through coordinated multipoint transmissions.

The T-TRP 170, the NT-TRP 172, and/or the ED 110 may include other components, but these have been omitted for the sake of clarity.

Figure 1D:
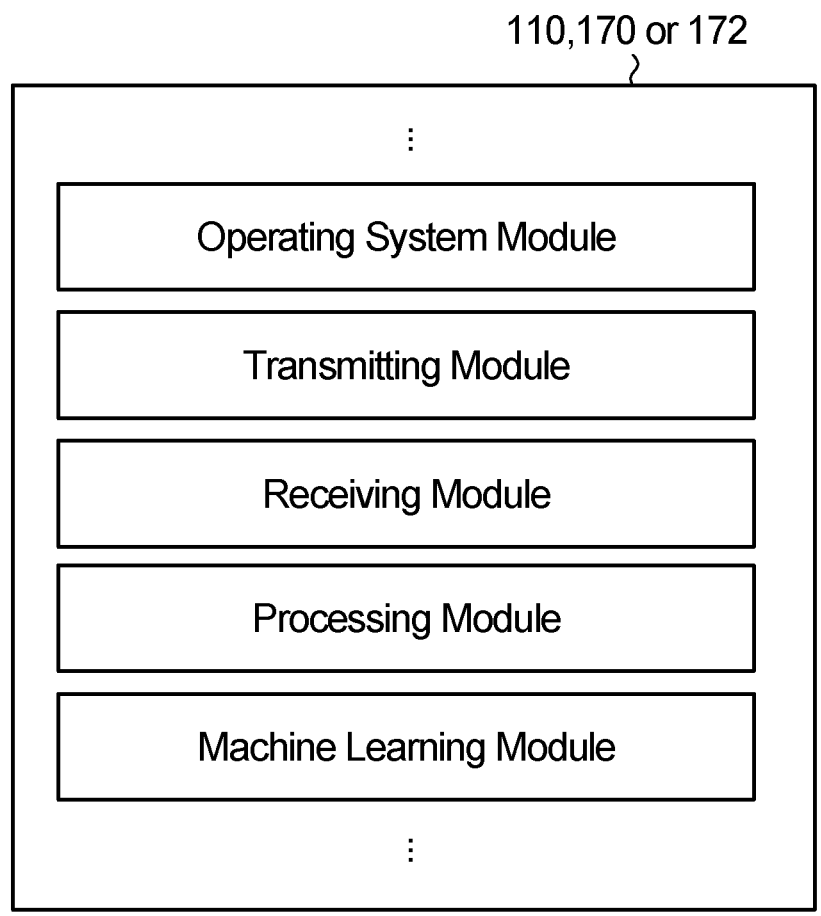
FIG. 1D is a block diagram of modules that may be used to implement or perform one or more of the steps of embodiments of the application.

One or more steps of the embodiment methods provided herein may be performed by corresponding units or modules, according to FIG. 1D. FIG. 1D illustrates units or modules in a device, such as in ED 110, in T-TRP 170, or in NT-TRP 172. For example, a signal may be transmitted by a transmitting unit or a transmitting module. For example, a signal may be transmitted by a transmitting unit or a transmitting module. A signal may be received by a receiving unit or a receiving module. A signal may be processed by a processing unit or a processing module. Other steps may be performed by an artificial intelligence (AI) or machine learning (ML) module. The respective units or modules may be implemented using hardware, one or more components or devices that execute software, or a combination thereof. For instance, one or more of the units or modules may be an integrated circuit, such as a programmed FPGA, a GPU, or an ASIC. It will be appreciated that where the modules are implemented using software for execution by a processor for example, they may be retrieved by a processor, in whole or part as needed, individually or together for processing, in single or multiple instances, and that the modules themselves may include instructions for further deployment and instantiation.

Additional details regarding the EDs 110, T-TRP 170, and NT-TRP 172 are known to those of skill in the art. As such, these details are omitted here.

Figure 1E:
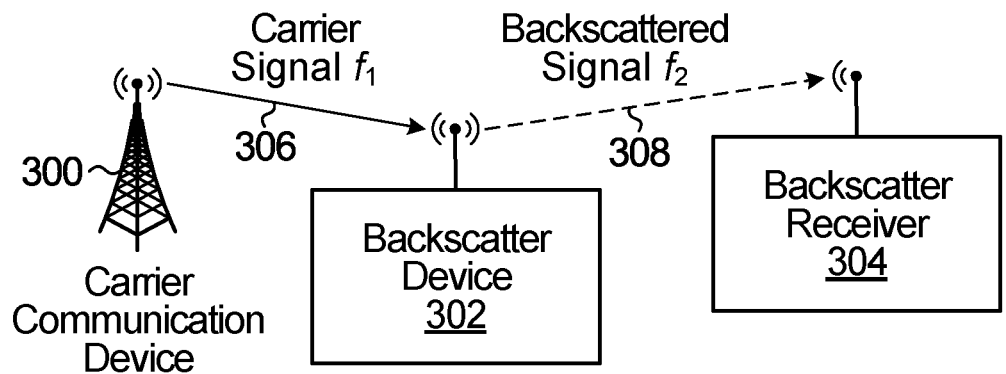
FIG. 1E is a system block diagram for bistatic backscatter communications.

A typical configuration for backscatter communication is depicted in FIG. 1E. Shown is a carrier communication device 300, a backscatter device 302, and a backscatter receiver 304. The carrier communication device 300 produces a carrier signal 306 which is received by the backscatter device 302. The backscatter device 302 uses the carrier signal 306 to modulate its own data and to generate and transmit a backscattered signal 308 for receipt by the backscatter receiver 304. The backscatter receiver 304 upon receiving the backscattered signal demodulates and decodes the backscatter device data.

In a legacy system, such as a UE in NR/LTE, data and the carrier signal originate from the same device whereas in a backscatter system, the carrier signal and data are from two separate nodes/devices in the communication system. When a dedicated carrier communication device generates a carrier signal for backscatter devices, such as is the case for the example of FIG. 1E, such systems are called bistatic backscatter systems. Alternatively, the backscatter device can backscatter using an ambient RF signal such as a Wifi/LTE/NR/television (TV) signal. Such backscatter systems are known as ambient backscatter systems. In these systems, an RF source (such as TV transmitter/Wifi access point, LTE/NR BS etc.) is considered as the carrier emitter/RF source and the backscatter device is allowed to operate within the same system utilizing the RF signals whose primary purpose is to provide service/communicate with their intended receivers. Furthermore, in an ambient backscatter system, there could be another network entity (physically in the same device as the ambient RF source or otherwise) to provide control signals.

There are systems in which the carrier communication device and the backscatter receiver are the same device/node, and these are referred to as monostatic backscatter systems. In a more typical scenario, the carrier signal is originated from another device than the backscatter device, and the backscattered signal will be in the same frequency as the carrier signal of the carrier communication device. As a backscatter device does not produce/generate its own carrier signal, the backscattered signal cannot be in any desired frequency and bandwidth. However, with RF level processing of the received signal, the backscatter device can shift the carrier signal by a certain amount in frequency. As such, the carrier signal originated from the carrier communication device may be centered at frequency $f_1$ Hz (center frequency) and the backscattered signal transmitted by the backscatter device may be centered at frequency $f_2$ Hz. This is the case in the example of FIG. 1E, where $f_2=f_1 \pm K\Delta F$ where $\Delta F$ Hz is the granularity of frequency shift for the backscatter device 302 and K=0, 1, 2, . . . . The backscatter device 302 capability determines the $\Delta F$ and K values it can support. In the special case of K=0, the backscattered signal and carrier signal are in the same frequency, i.e., $f_1=f_2$ and the carrier signal is not shifted in frequency by the backscatter device 302. Voltage controlled oscillator/phases shifts provide a low-cost and low-complexity approach to shift the carrier frequency at the RF level. While this approach can produce unintended harmonics, they can be controlled by using a higher number of phase shifts. It should be noted that using voltage controlled oscillator/phase shifts is not the only approach for the backscatter device to shift the frequency of the backscattered signal.

Figure 2:
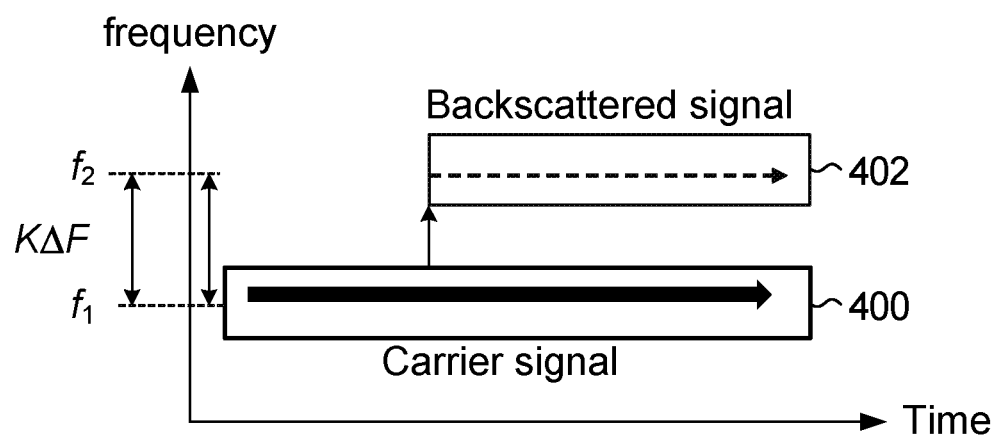
FIG. 2 shows an example of backscatter carrier frequency shift.

For $K \neq 0$, the backscattered signal and the carrier signal frequency are as shown in the FIG. 2, where time is shown on the horizontal axis, and frequency on the vertical axis. As shown in FIG. 2, the carrier communication device generates a carrier signal 400 centered at frequency $f_1$, and the backscatter device shifts this to produce a backscattered signal 402 centered at a frequency $f_2=f_1+K\Delta F$. The carrier signal originated from the carrier communication device can carry a limited amount of data for a backscatter device. The backscatter device can semi-statically adjust some parameters based on the received data. The carrier signal may also be used for charging the backscatter device battery or as a power source. However, a given carrier signal which is used to carry data and/or transfer power wirelessly to a backscatter device may not be optimal for backscattering purposes. Alternatively, one phase of the carrier signal may be used for wireless power transfer/data reception and another phase of the carrier signal is used for backscattering, and the two phases are time domain multiplexed. As the two phases are time domain multiplexed, the frequency can be the same for both phases but other properties such as amplitude can be different. For example, in first phase intended for charging, a signal with less amplitude fluctuation may be used. In the second phase for backscattering, less amplitude fluctuation is not needed. These two phases can also be in two separate frequencies, in which case, the backscatter device uses a carrier in one frequency for charging/data reception, and uses a carrier in another frequency for backscattering.

In one example, a carrier signal emitted by the carrier communication device 300 in the charging and/or data reception phase is different from a carrier signal emitted by the carrier communication device 300 in the backscatter phase (i.e., communicating data from the backscatter device 302 to the backscatter receiver 304). For example, during the charging phase, a carrier signal with constant/less fluctuating signal envelope/amplitude can be more efficient (for wireless power transfer). DFT-s-OFDM is one such carrier waveform with low-PAPR properties. On the other hand, during the backscatter phase, a carrier signal with a constant/less fluctuating signal envelope are not necessarily optimal. In a similar manner, the carrier signal for charging can be different from the carrier signal for data reception (i.e., data communicating carrier from the communication device 300 to the backscatter device 302) indicating the existence of two phases for charging and data reception. The backscatter device may have the capability to detect the change/data transition of the carrier signal and therefore, the boundaries of the charge and/or data reception phase(s) can be implicitly known/detected by the backscatter device. On the other hand, the boundaries of the charging and/or data reception phase(s) are prior known to the backscatter device (by specification or control signalling). For example, after a pre-specified time delay from the beginning of the carrier signal, backscattering phase starts. In an exemplary scenario, the carrier shift by an amount of $K\Delta F$ Hz where $K=0, 1, 2, \ldots$ is required during the backscattering phase while the charging/data reception is performed using the received carrier centered at $f_1$ Hz.

Figure 3A:
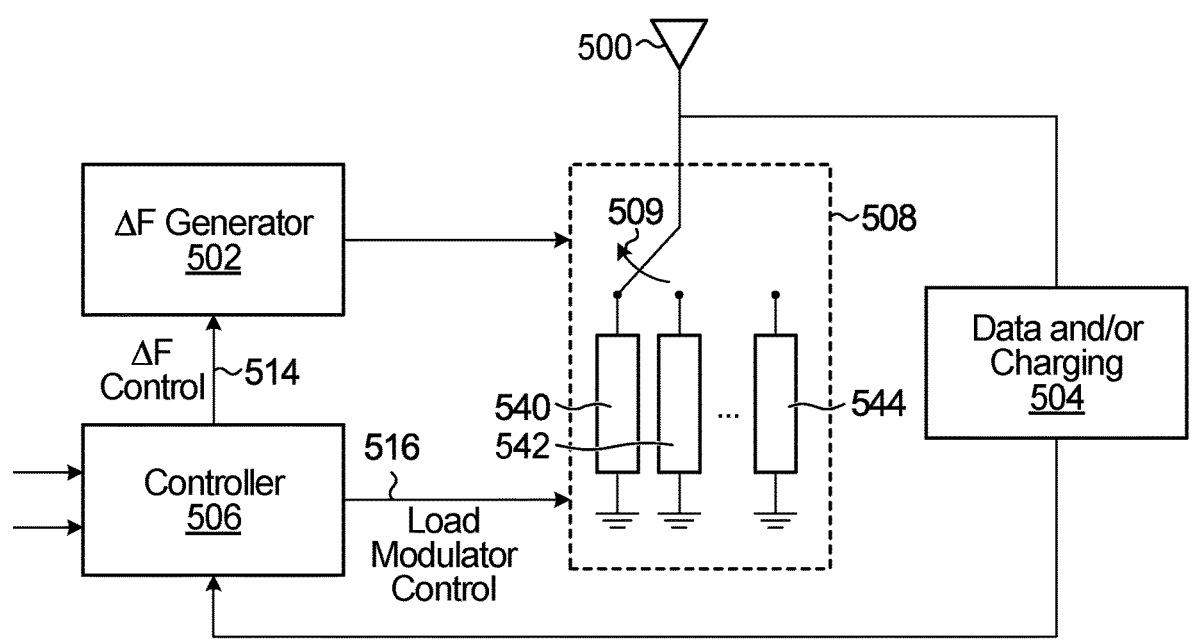
FIG. 3A is a block diagram of an example backscatter device.
Figure 3B:
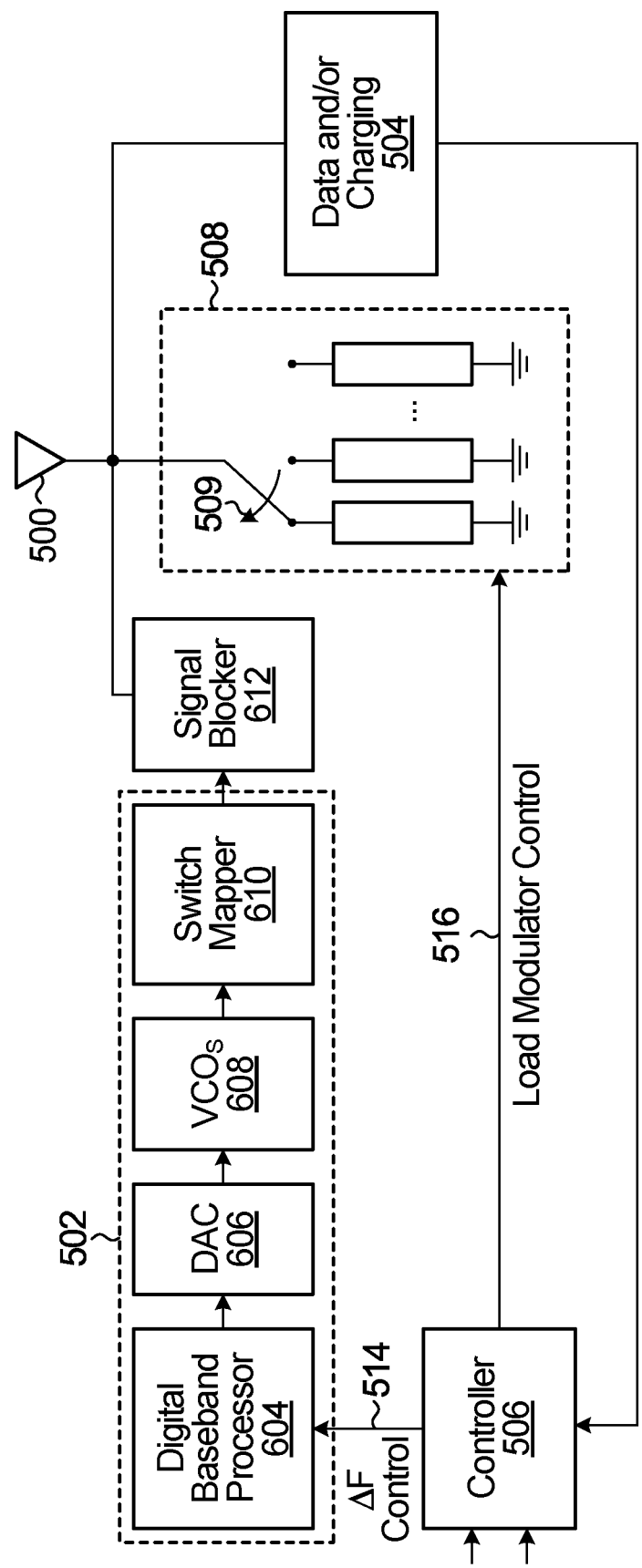
FIG. 3B is a block diagram of another example backscatter device.

FIG. 3A is a block diagram of an example of a backscatter device. The device has an antenna 500 for receiving the carrier signal, and for transmitting the backscattered signal. There is a $\Delta F$ generator 502 for generating a shift signal having a frequency of $K\Delta F$ Hz where $K=0, 1, 2, \ldots$. A specific example of a $\Delta F$ generator 502 is shown in FIG. 3B. There is a data and/or charging block 504 for extracting data from the received carrier and/or charging the device using the received carrier. There is a controller 506 for receiving input from one or more sensors and for determining if there is data to transmit. The sensors are data sources that generate small amounts of data. The controller 506 is also connected at 514 to control the $\Delta F$ generator 502 for instructing the $\Delta F$ generator 502 what frequency shift to be applied so as to generate the carrier frequency preassigned to that device. The shift signal output by the $\Delta F$ generator 502 is multiplied by the received carrier signal to produce a shifted carrier signal. The controller 506 is connected at 516 to a load modulator 508. The load modulator 508 has a number of impedances 540, 542, ..., 544, including one or more loads (impedance(s)) to produce each constellation symbol in the backscattered signal. The load modulator 508 also has a switch 509, controlled by the controller 506, which connects one or more of the loads to the antenna 509.

Generation of the backscatter signal from the emitted carrier is described in more detail below with reference to FIGS. 5 and 6. For example, if there is a new input from one of the sensors, there is data to be transmitted. If the input from the sensors is a number of bits that matches the constellation implemented by the load modulator, then the bits can be mapped directly to the constellation. Otherwise, the controller may process the input bits from the sensors and produce a set of bits that can be mapped directly to the constellation. Such processing of by the controller may include at least one or more of adding parity check code, check sum, forward error correction code, error detection, rate matching, adding redundancy bits, adding filler bits to have a fixed length, truncating, removing, pruning or puncturing bits, segmentation, splitting bits into multiple streams of bits, bit repetition, bit scrambling, or bit interleaving etc. When there is data to transmit, based on the data to transmit, the controller 506 controls switch 509 to connect one of the impedances to the output. The received carrier signal is shifted by $K\Delta F$ Hz (where $K=0, 1, 2, \ldots$) as a result of multiplication with the output of the $\Delta F$ generator 502. The shifted carrier reflects off the connected impedance in the load modulator, and the reflected signal exits the backscatter device via antenna 500 as a backscatter signal.

The impedances 540, 542, 544 in the load modulator 508 are matched to a desired set of constellation points. The bits of data to transmit are used by the controller 506 to select which impedance is connected in the load modulator 508 such that the corresponding constellation point is produced at the output of the load modulator. The signal output by the load modulator 508 may be one symbol or a sequence of symbols from the constellation implemented by the impedances in the load modulator. As a result, the backscattered/reflected signal mimics/imitates modulation. This is a low-complexity/low-cost approach to modulation that requires only a network of impedances as compared to an active device with baseband processing and many components such as D/A convertor, up-convertor as mentioned before. A complex constellation of size N requires N impedances. Each impedance $Z_i$ is matched to a constellation point. Therefore, supporting multiple modulation sizes (e.g. both QPSK and 16-QAM) by the same device is not straightforward/cost effective. This is because QPSK has 4 different constellation points while 16-QAM has 16 different constellation points. A larger number of impedances is needed to support multiple modulation schemes.

FIG. 3B is a block diagram of another example of a backscatter device. The example is similar to FIG. 3A, but includes details of a specific implementation of a $\Delta F$ generator, indicated at 602. The $\Delta F$ generator 602 has a baseband processor 604, digital to analog converter (DAC) 606, a set of voltage controlled oscillators 608, and switch mapper 610. The output of the $\Delta F$ generator 602 is connected through a signal blocker 612 to the antenna 500.

In operation, the $\Delta F$ generator 602 generates a shift signal as detailed below. This passes through the signal blocker 612 to the connection point with the antenna 500. This connection has the effect of multiplying the received carrier signal by the shift signal to produce a shifted carrier signal. The ΔF generator 602 in combination with the connection point, which functions as a multiplier, together form a specific example of a frequency shift circuit for producing a shifted carrier signal from a received carrier signal. The shifted carrier signal reflects off a connected impedance as described before. The signal blocker 612 allows the shift signal to pass from the ΔF generator 602 to the antenna 500, but does not allow or minimize the reflected signal from the load modulator to pass towards the ΔF generator 602. The signal blocker 612 may for example be implemented with diodes and/or transistors or other circuits and RF components that allow a signal with a frequency ΔF to pass through (to generate the shifted carrier), but block signals at the shifted carrier frequency (to avoid the power loss in the backscattered/reflected signal).

Turning now to the specifics of the ΔF generator, in the illustrated example, a carrier signal $e^{2\pi f_c t}$ at frequency $f_c$ is multiplied with a complex signal $e^{2\pi f \Delta F t}$ generated from the ΔF generator, where ΔF represents a selected frequency offset. The resulting signal $e^{2\pi (f_c + \Delta F)t}$ is generated in a band centered at $f_c+\Delta F$ compared to the original signal frequency $f_c$. Moreover, $e^{2\pi f \Delta F t} = \cos(2\pi \Delta F t) + j \sin(2\pi \Delta F t)$ where $j=\sqrt{-1}$ and therefore, the synthesis of $e^{2\pi f \Delta F t}$ includes generating cosine and sine waves. This is achieved/approximated by combining several phase shifted square waves output by the VCOs 608. In order to generate a perfect cosine or sine wave, an infinite (in theory) number of square waves are required. However, in practice, cosine/sine waves are approximated by summation/combining a finite number of square waves. The drawback of such approximation is the harmonics, i.e., signals in different frequencies other than the intended frequency.

Referring again to FIG. 3B, the digital baseband processor 604 outputs a b-bit signal, determined based on the control input from the controller 506. The DAC 606 takes this b-bit as input and outputs an analog voltage output at $2^b$ voltage levels. Each of the VCOs 608 is a device that outputs a square wave signal (i.e., clock with a frequency) that is proportional to the input voltage. The analog voltage output of the DAC 606 controls the frequency of the VCO output. The sine and cosine signals (i.e., components of a complex signal such as $e^{2\pi f \Delta F t}$) can be approximated as a sum of one or more square wave(s) output from the VCOs 610. The manner in which the square waves output by the VCOs 610 are combined to produce the approximation to the sine and cosine signals is controlled by switch mapper 610. If the received carrier is a signal $e^{2\pi f_c t}$ and the frequency shift circuit generates a signal $e^{2\pi f \Delta F t}$ (approximately), the backscattered signal can be given as $e^{2\pi (f_c + \Delta F)t} = e^{2\pi f_c t} \times e^{2\pi f \Delta F t}$ which is centered at frequency $f_c+\Delta F$ as compared to the received carrier at frequency $f_c$.

Although the square wave based technique using VCO is low-complex/low-power, making it suitable for backscatter type of devices, this technique of frequency shifting of incoming signal can create out-of-band harmonics (signals in un-intended frequencies than the intended shifted frequency). By increasing the voltage levels of the VCO, the dominant harmonics can be cancelled. To cancel higher order harmonics, a higher number of voltage levels at the VCO output can be used which increases complexity. However, to keep the device power/cost at low, a small number of square waves can be used which cancels the dominant power frequencies/harmonics. Other remaining frequencies/harmonics exist in the backscattered signal. Such harmonics are tolerated to keep the device cost less expensive. A receiver may use some methods to deal with such frequencies, or the overall system may be designed to tolerate such harmonics.

It should also be noted that the constellation symbol (information bearing symbol of the backscattered signal) can be represented by the amplitude, the phase, frequency or other such properties of the backscattered signal. As such, frequency shift circuitry with the load modulator can produce the backscatter signal where the backscattered signal is shifted to a different frequency compared to the incoming signal (source emitted signal) while some unintended harmonics may exist (in the backscattered signal) due to imperfect harmonic cancellation. In order to reduce the harmonics and/or unintended interference in a shifted carrier, filters can be used. Such harmonics and/or unintended interference can be originated from frequency shift operations or other operations within the backscatter device including imperfect RF coupling, load impedance mismatch among others. In one method, the incoming carrier signal is multiplied by the desired frequency shift signal and the resulting signal (which consists of some harmonics due to imperfect frequency shift and other impairments) can be passed through a filter before entering the load modulator. In some other methods, a filtering technique can be used after the load modulator to remove an unintended RF signal in the backscatter communication system. It should be mentioned that the interference (generated from the unintended harmonics or interference due to imperfect filtering etc.) can be randomized by using the symbol scrambling or spreading as described herein.

The VCO based technique and/or signal filtering techniques are specific examples; there can be many techniques for shifting the frequency of the received carrier to another frequency in backscatter devices.

Figure 5:
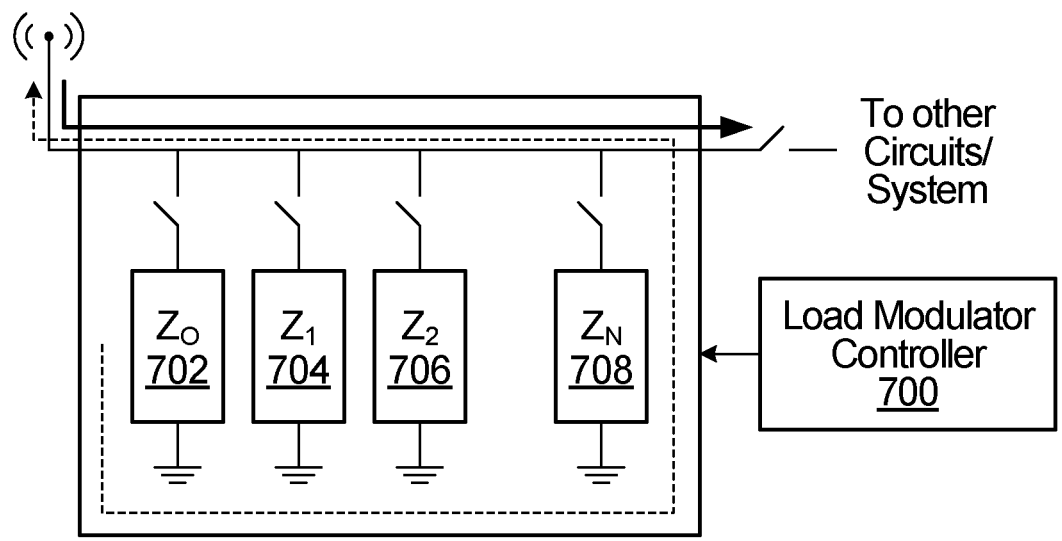
FIG. 5 is a block diagram of a load modulator that has the ability to support sparse sequence generation.
Figure 6:
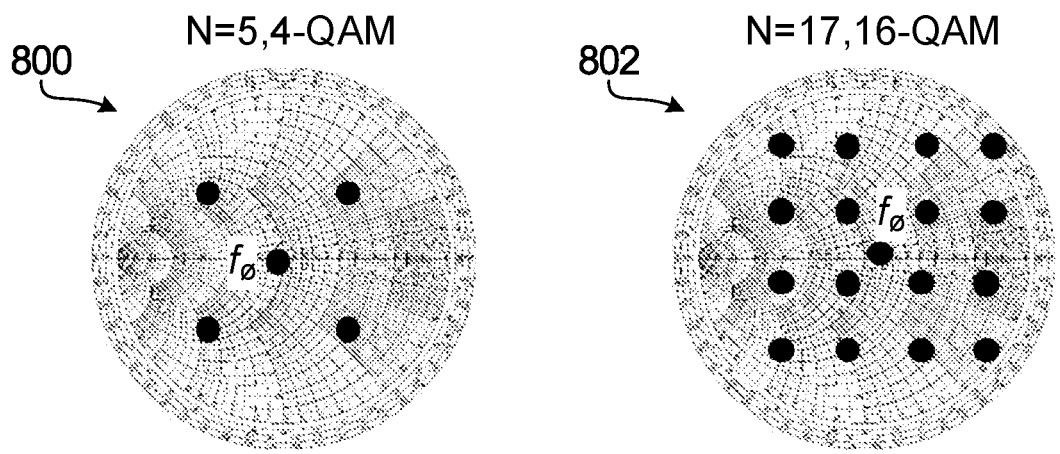
FIG. 6 depicts two examples of load modulation constellations with the ability to support sparse sequence generation.

FIG. 5 shows an example of a load modulator, for example, the load modulator 508. There is a respective impedance $Z_1, \ldots, Z_N$ 704, 706, . . . , 708 associated with each constellation point. A load modulator controller 700 controls which impedance is active at a given time. Also shown is an optional additional resistive impedance $Z_0$ 702 for supporting sparsity, as discussed in further detail below.

A backscatter transmission scheme is provided in which a carrier signal is transmitted by a carrier communication device discontinuously as carrier signal bursts. The carrier signal, while it is on, is divided into carrier time segments. Each carrier time segment has a specified time offset from the beginning of the carrier signal burst. The different carrier time segments represent different times that backscatter devices can make backscatter transmissions. In addition, in some embodiments, a set of frequencies are available for backscatter transmission. The set of frequencies includes the carrier frequency and a set of frequencies with respective frequency shifts relative to the carrier frequency. In addition, in some embodiments, a set of spreading (which may be sparse or non-sparse spreading) and/or scrambling codes are available for backscatter transmission. The combination of a specific carrier time segment, a specific frequency shift and a specific spreading/scrambling code, when used, together constitutes a specific backscatter transmission opportunity, also referred to herein as a transmission unit (TU) and a backscatter transmission channel.

Each backscatter device transmits using a pre-assigned backscatter transmission opportunity, such that it transmits during a pre-assigned carrier time segment, using a pre-assigned frequency shift from the received carrier signal frequency. In embodiments that include spreading or scrambling, each backscatter device transmits using a pre-assigned spreading or scrambling code.

More generally, a backscatter device receives a carrier signal from a carrier communication device, the carrier signal having a start time, which is a time that transmission of the carrier signal starts. The backscatter device produces a backscatter carrier signal from the received carrier signal. At a time offset relative to the start time, the backscatter device generates and transmits a backscattered signal by modulating data using the backscatter carrier signal. The time offset is predefined for the backscatter device and at least in part defines a time dimension of a transmission resource to be used by the backscatter device. The above introduced carrier time segments provide a specific example of a set of possible predefined time offsets.

In some embodiments, frequency shifts are also used, as introduced above, and the backscatter device producing a backscatter carrier signal from the received carrier signal also involves applying a frequency shift to the received carrier signal, the frequency shift being one of a set of possible frequency shifts, the set of possible frequency shifts including a zero frequency shift. The frequency shift is predefined for the backscatter device and at least in part defines a frequency dimension of the transmission resource to be used by the backscatter device.

Exemplarily, the predefined time offset is not random, and the predefined frequency shift, when used, is not random. A predefined time offset and a predefined frequency shift each encompasses a respective value that is previously known, non-random, deterministic, a priori derived, explicitly informed, implicitly informed, informed, signaled in advance etc.

The remainder of this detailed description assumes the use of predefined time offsets and frequency shifts, but it should be understood that corresponding embodiments are contemplated in which the predefined time offsets are implemented, and the frequency shifts are not necessarily implemented.

The transmission scheme is also referred to herein as a pre-assigned resource-grid-based backscatter multiple-access scheme. In some embodiments, the frequency shift, time-offset and spreading or scrambling code are obtained in a device specific manner, for example, as a function of the device ID. The set of possible frequency shifts and time offsets may include 0. In other words, for a given device, the time offset from the beginning of the carrier signal burst may be 0 s and/or the frequency shift from the carrier signal frequency may be 0 Hz.

In some embodiments, where linear or non-linear spreading and/or scrambling is performed, the alphabet of the spread/scrambled symbol sequence is restricted to the constellation symbol alphabet, i.e. the symbol alphabet output by modulation. This is referred to herein as restricted symbol spreading/scrambling. In some embodiments, sparse spreading is enabled by a single impedance (high resistive) within a load modulator for generating a sparsity/zero symbol by blocking the reflecting/backscatter signal. As such, restricted spreading may be used for collision handling where sparse/non-sparse spreading is enabled by restricted load modulation. An advantage of this approach is that spreading/scrambling can be accommodated without increasing the number of impedances in the load modulator.

In some embodiments, the carrier communication device transmits carrier signal bursts periodically. The periodicity between carrier signal bursts can be determined as a function of the number of backscatter devices to support, traffic conditions of the system, or on some other basis. When the number of backscatter devices is high, or when there is high traffic demand, the separation between consecutive carrier signal bursts, referred to herein as the inter burst gap, can be very small, including 0 seconds in some embodiments. In the special case of 0 seconds inter burst gap, the carrier is emitted continuously, and this can be considered an always-on carrier. A non-zero inter burst gap is beneficial in scenarios such as when there is low traffic demand, or when the number of devices is small. A longer inter burst gap allows for a relatively longer device cool-off time duration. In some embodiments, a group of carrier signal bursts may have the same inter burst gap or may have different inter burst gaps. Using equal inter burst gaps is simple in design. In some embodiments, a pre-specified pattern of inter burst gaps is used by the carrier communication device, and this can be used by the backscatter devices to acquire time (time synchronization). In some scenarios, the carrier communication device may indicate certain signaling information by the inter burst gap pattern. For example, a burst group of size 3 (3 carrier signal bursts), having gaps $T_{11}$, $T_{12}$ (first inter burst gap pattern) could indicate first signaling information, and a burst group of size 3, having the gaps $T_{21}$, $T_{22}$ (second inter burst gap pattern) could indicate second signaling information. Such signaling may be used to convey information such as transmission mode, where device behavior for a given transmission mode is pre-specified, or carrier usage, where a less capable device may be configured to use the carrier in a different manner from a more capable device etc.

In a first specific example, the signaling information is used to convey transmission mode selection. In a specific case where there are two transmission modes, a first inter burst gap pattern is used to convey a first transmission mode selection, specifying a first associated behavior and a second inter burst gap pattern is used to convey a second transmission mode selection, specifying a second associated behavior.

In a second specific example, signaling information is used to convey carrier usage. For example, a first inter burst gap pattern is used to instruct less capable devices to use the carrier with no frequency shift and to instruct more capable devices use the carrier with some frequency shift. A second inter burst gap pattern is used to instruct all devices to use the carrier without a frequency shift.

Figure 4:
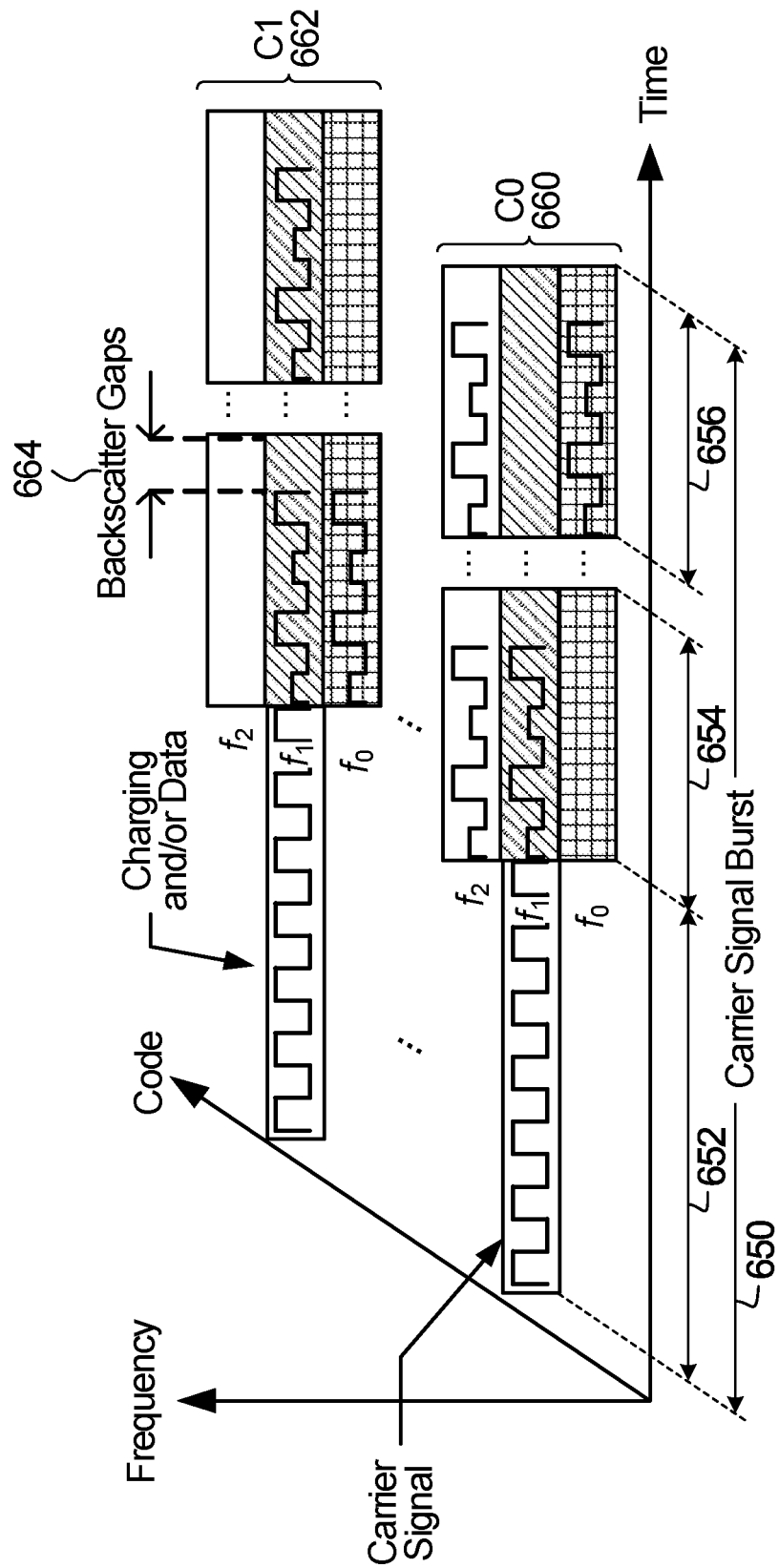
FIG. 4 is an example of a pre-assigned resource grid for backscatter multiple-access communication.

FIG. 4 shows a specific example of a pre-assigned resource grid based multiple access communications scheme. In FIG. 4, time is along the horizontal axis, frequency is on the vertical axis, and a spreading/scrambling code dimension is shown pointing into the page. A carrier signal is transmitted during a carrier signal burst 650. There is a carrier time segment 652 dedicated to charging and/or data transmission by the carrier communication device, referred to herein as a dedicated carrier time segment. This dedicated carrier time segment may also be used for synchronization (acquire timing), or for device activation (i.e., backscatter device to detect the existence of the carrier and/or to be ready for communication). More generally, the backscatter device may perform charging of a battery the backscatter device and/or perform data reception using the received carrier signal during a time that does not overlap with a time segment of the transmission resource used for backscatter transmission.

While the dedicated carrier time segment 652 is dedicated for one or more specific purposes, some backscatter devices may be configured with the capability to backscatter using this dedicated carrier time segment in the same frequency, or using a shifted frequency. Such transmissions may or may not use a spreading/scrambling code to provide code domain separation. Some backscatter devices may not have the capability to backscatter using this dedicated carrier time segment. Some backscatter devices may choose to or be configured to avoid backscattering during this dedicated carrier time segment. This dedicated carrier time segment 652 can be at the beginning of a carrier signal burst 650 (as shown in FIG. 4) or anywhere in the carrier signal burst. There may be multiple dedicated carrier time segments within a carrier signal burst.

In addition to the dedicated carrier time segment, the carrier signal burst has pre-defined carrier time segments during which a backscatter device can backscatter. In the example of FIG. 4, shown is a first carrier time segment 654 and a last carrier time segment 656. There may be additional carrier time segments, not shown. During the dedicated carrier time segment 652, and carrier time segments 654, . . . , 656, the carrier communication device transmits the carrier signal using a fixed carrier frequency. More generally, there may be $K_1$ time segments available for backscatter transmission. Each carrier time segment has an associated time offset from the start time of the carrier signal burst such that upon receipt of a carrier signal burst by a backscatter device, the various carrier time segments can be located relative to the start time of the carrier signal burst.

In conventional backscatter communications, due to the complexity of scheduling based transmission for backscatter devices, randomly selecting the transmission resource can be thought of as a viable alternative. In the embodiments provided in the present disclosure, using a pre-defined/pre-specified resource without using a resource at random for backscatter communication has many advantages compared to conventional backscatter communications.

When a backscatter device in conventional backscatter commutations picks a resource at random for its communication/backscattering, it can lead to a situation of a large number of devices backscattering within the same resource simultaneously. If backscatter device detects collision and/or backscatter device decides/knows the communication is unsuccessful, backscattering can be performed again (immediately or after a certain time). However, such mechanism rely on backscatter device being able to detect collision and/or decide/know (through signaling or other methods) which are too complex for a low-complexity/low-cost backscatter devices. As such, backscatter device is considered incapable of detecting collision (carrier sensing). Carrier sensing is done by monitoring the signal collision which is too complex for a backscatter device to perform due to high device complexity and high cost. On the contrary, in the embodiments provided in the present disclosure, by pre-specifying the resources for the backscatter device, the number of backscatter devices potentially backscatter in a given resource can be controlled avoid the need for carrier sensing/collision detection or knowing the unsuccessful transmissions making the backscatter communication devices simple and low-complexity/low-hardware.

Moreover, if backscatter devices backscatter at random, it may cause large collisions, and such collisions make the reception and decoding poor. This may result in the consumption of additional backscatter device power and the wasting of carrier resources by repeated backscattering (until communication is successful). Therefore, life-time for the backscatter system can be shorter due to a large number of transmission failures and re-transmissions consuming a large amount of device power (e.g. processing power, load modulator controlling functions etc.). However, in the embodiments provided in the present disclosure, when the transmission resources are pre-defined, by reducing the transmission failures, life-time of the communication system and backscatter power efficiency can be improved.

In the conventional backscatter commutations, when there are two backscatter devices backscattering at a random resource to the same receiver, those receptions can collide at the receiver end. Due to the weak signal reception at each backscatter device from each other's signals, even if the backscatter device is capable of carrier sensing, each device may fail to detect the presence of another device (i.e., failure to sense the carrier). Such a situation can be considered as backscatter devices hidden from each other. Hence, each device will transmit/repeatedly transmit and their transmissions will collide repeatedly. To avoid this issue, signaling between the backscatter receiver and backscatter device can be used. For example, if the receiver determines the reception failed, receiver indicate (through signaling, for example) to the backscatter device. In the embodiments of the present disclosure, having pre-defined resource for backscatter devices, hidden backscatter devices can be controlled at a reasonable levels. In addition, it also may further reduce the complexity of signaling transmission for reception failures for backscatter based communication system.

In the conventional backscatter commutations, when repeated transmission occur due to repeated collisions or failures, the low-cost backscatter devices can self-heat due to more frequent transmission/re-transmission. Keeping the self-heating low will help the components (e.g. frequency drift of low-cost oscillator) to produce the desired output without impairments. On the contrary, having pre-specified resources for low-cost backscatters may reduce the re-transmission attempt minimizing the self-heating.

In conventional communications, the backscatter devices does not generate the carrier signal but rely on a carrier signal transmitted by an external carrier emitter. For the device to backscatter at random in a resource, the carrier emitter needs to have the carrier available when the backscatter device accesses the carrier at random. This may require the system to provide an always-on carrier which makes the system power inefficient. Unlike the conventional communications, the present disclosure provides embodiments having a pre-defined resources for backscatter devices, carrier only be available during the times the backscatter devices allowed backscattering. This may improve the system power efficiency, backscatter device self-life and reduce interference.

In conventional communications, when the backscatter devices transmit at random, the receiver is unaware of the identity of the backscatter device. As such, if the identity of the backscatter device is needed, and the receiver needs to perform blind decoding with high complexity. If backscatter devices transmit at random, any number of devices can be transmitting simultaneously. Therefore, the receiver needs to perform device activity/inactivity detection. This is extra overhead for the receiver and activity detection errors can lead to a large number of decoding errors, increased re-transmission etc. In embodiments of the present disclosure, having a pre-defined resources for backscatter devices, only a known number of devices potentially become active in a given resource which reduces the complexity for detecting the device identity and/or device activity/inactivity.

In conventional communications, in an implementation where a backscatter device integrates its identity into to the payload, this may incur large overhead. Such overhead can be challenging for low data rate backscatter systems which aim for small payload transmissions (e.g. sensing information). In embodiments of the present disclosure, by allowing a few known set of devices in a given resource by predefined/pre-specified resource grid, integrating the device identity can be eliminated or number of bits for device identity can be reduced.

According the embodiments of the present disclosure, no need to receive a large amount of signaling information by the backscatter devices to instruct the devices which physical resources to use. Thus, the resource efficiency could be improved and the complexity of the system operation may be reduced. Moreover, the opportunity for backscattering is increased. The hardware complexity also is low since no need to make the backscatter device capable of receiving data from the carrier signal while using the same carrier for backscattering, which results in lower backscatter device cost and overall system complexity. Furthermore, the backscatter devices are capable of generating a backscatter signal in desired frequency/time resource grid (even if the device is scheduled in a given resource).

FIG. 4 shows a set of possibilities for a frequency to use for backscatter transmission. In the illustrated example, there are three possibilities for backscatter transmission— one at the received carrier frequency $f_1$, one at a frequency $f_2$, higher than the received carrier frequency, and one at a carrier frequency $f_0$, lower than the received carrier frequency. More generally, there may be L frequency shifts for use with backscatter transmission, including the 0 shift.

FIG. 4 also shows a set of possibilities for a spreading/scrambling code to use for backscatter transmission. Transmission resources 660 are associated with a first spreading/scrambling code C0, and transmission resources 662 are associated with a second spreading/scrambling code. More generally, there may be M spreading/scrambling codes.

Where there are $K_1$ carrier time segments available for backscatter transmission (which may or may not include one or more dedicated carrier time segments), and L frequency shifts, and M spreading/scrambling codes, it can be seen that there are $K_1 \times L \times M$ permutations (or just $K_1 \times L$ where spreading/scrambling is not used), each of which is a specific backscatter transmission opportunity. $K_1$, L and M are integers $\geq 1$.

Each backscatter device is preassigned one of these backscatter transmission opportunities. In other words, each backscatter device has a pre-assigned frequency shift (including the possibility of zero), a pre-assigned carrier time segment or time offset, and, when spreading/scrambling is used, a pre-assigned spreading/scrambling code. In some embodiments, as detailed above, for certain devices, a time offset of zero from the beginning of the carrier signal burst is a possibility.

In operation, a given backscatter device monitors for the presence of a carrier signal burst transmitted by the carrier communication device. If the backscatter device has data to transmit, then during the pre-assigned carrier time segment, the backscatter device generates a backscattered signal by frequency shifting the received carrier signal burst by the pre-assigned amount, modulating the data to send using the shifted carrier signal and applying the pre-assigned spreading/scrambling code, and then transmitting the backscattered signal. In some embodiments, a given backscatter device only starts to monitor for the presence of a carrier signal burst when it has data to transmit. This may occur on a periodic basis, or on some other basis, for example, when sensor data is received from one or more sensors. In some embodiments, sensor data of a given sensor is not transmitted unless it is changed by some minimum threshold amount from the previously transmitted value. The backscatter receiver attempts to receive on all of the possible backscatter transmission opportunities. Alternatively, the backscatter receiver may have knowledge of which backscatter transmission opportunities have been pre-assigned, and only attempts to receive the backscatter transmission opportunities that have been pre-assigned.

Various advantages of the pre-assigned resource-grid-based multiple access will now be described.

Collision/repeated collision mitigation: The backscatter receiver does not receive at just any carrier time segment of the carrier. Pre-assigning which carrier time segment of the carrier a given backscatter device is allowed to use for backscatter transmission constrains the number of backscatter devices accessing the physical resources at a given time. More specifically, the number of backscatter devices simultaneously accessing a given carrier time segment can be managed/controlled to be at tolerable levels. Therefore, the collisions are within acceptable limits. The approach does not rely on carrier sensing, or extensive signaling schemes such as CTS/RTS (clear to send/request to send). As the number of transmission failures and repeated transmissions are limited, system life-time is improved and device processing power is reduced. Moreover, the impact of the hidden terminal issue is reduced by controlling the number of devices accessing the physical resources.

Carrier signal burst that avoids an always-on carrier: With the carrier being transmitted as a sequence of carrier signal bursts, with inter burst gaps, this avoids the need for an always-on carrier. Having a carrier transmitted in bursts reduces device/hardware costs, reduces device self-heating, improves system power efficiency, and reduces interference.

Simplified backscatter identification/activity detection: Only a known number of backscatter devices can be active in a given transmission opportunity, so all that is needed is to be able to distinguish between those known number of backscatter devices.

Uplink asynchronous transmission support: In some embodiments, each backscatter device is allocated a carrier time segment of a carrier signal burst and the backscatter device transmits its backscattered signal within less than the entire pre-assigned carrier time segment, leaving a transmission gap, also referred to as a backscatter gap. An example is shown in FIG. 4, where there is a backscatter gap 664 during carrier time segment 654. The inclusion of such a backscatter gap minimizes the need for tight synchronism among backscatter devices. Moreover, in some embodiments, a long cyclic prefix (CP) for OFDM type of carrier is used to mitigate the impact from the asynchronism.

Improved charging capability: The backscatter devices can utilize the other carrier time segments (the ones other than the pre-assigned carrier time segment for a given device) for wireless power transfer/device charging.

Simultaneous backscattering and data reception/charging: When a device backscatters while at the same time receiving data from the carrier communication device, the process of receiving data can be interfered by the device's own backscattered signal. To avoid this, the backscatter device can shift the carrier signal to another frequency different from the incoming carrier signal frequency (i.e., pre-assigned frequency shift). This allows the backscatter device to transmit in a different frequency than the received carrier signal while at the same time receiving data and/or charging using the original carrier frequency.

Device capability dependent resource grid: The resource grid (i.e. the set of possible opportunities for backscatter transmission based on a given carrier transmission) can be defined differently for different devices, for example, taking into account different capabilities of different backscatter devices. In a specific example, there may be a difference in the ability of devices to implement the carrier frequency shift. More capable devices may be able to implement a larger frequency shift relative to less capable devices. Therefore, multiple constrained resource grids can be supported from the same carrier signal. This provides the flexibility to define a resource grid based on the device capability.

Better downlink synchronization, channel estimation and link performance: In some embodiments, a dedicated carrier time segment of the carrier signal can be allocated for specific purposes; this can also be referred to as a dedicated channel. This can be used, for example, to disseminate grid information from a carrier communication device to the backscatter device, and/or for downlink synchronization (device timing acquisition from the carrier communication device) and and/or for channel estimation. For example, device and system configuration can be informed/signaled semi-statically from dedicated channels. In another example, all devices use the carrier to backscatter during a dedicated carrier time segment providing an opportunity for the receiver to acquire timing, estimate the channel etc.

While having one or more of the aforementioned advantages for the system, the pre-assigned resource-grid-based multiple access limits the number of devices able to transmit immediately upon receipt of a carrier signal burst and therefore, such a scheme may not be suitable for extremely delay sensitive applications or limited memory to buffer the data while awaiting for the data transmission/backscatter opportunity. However, by defining a resource grid with small carrier time segments, and allowing devices to access the carrier in multiple occasions within a single carrier signal burst, and by controlling the inter-burst gap to be small (eg. The periodicity of the bursts transmissions), the delay can be controlled.

In some embodiments, the bandwidth of the carrier signal (not shown in Figures) and supported frequency shifts can be such that the two signals (the original carrier signal and frequency shifted signal) are non-overlapping or overlapping in the frequency domain.

In one example, a carrier communication device emits a carrier signal at frequency $f_1$ Hz with a carrier bandwidth of $15 \times 2^\mu$ kHz for a given $\mu$ where $\mu$ is one of $\ldots, -3, -2, -1, 0, 1, 2, 3, \ldots$ and a backscatter device transmits a backscattered signal for reception by a backscatter receiver at frequency $f_2$ Hz with a bandwidth $15 \times 2^\mu$ kHz where $f_2 = n \, 15 \times 2^\mu + f_1$ and $n = 0, 1, \ldots, n_{max}$. Here $n_{max}$ is an integer relating to the maximum frequency offset $\Delta F = n \, 15 \times 2^\mu$ supported by the device/system. Note that the carrier bandwidth is the same for the carrier communication device and backscattered signal transmission, and the granularity of frequency shift ($\Delta F$) is the same as the carrier signal and backscatter signal bandwidth. The difference $\Delta F$ is defined as the distance between the center frequencies of the carrier signal and backscattered signal. In this example, the bandwidth of $f_1$ and $\Delta F$ are the same (i.e., $15 \times 2^\mu$). Therefore, in a situation where $n=1$, the two bandwidths are adjacent, and touch in the edges. Note that in the case where $n=0$, the carrier center signal frequency $f_1$ is the same as backscatter signal center frequency $f_2$. These are specific examples. But in the general case, it is not a requirement that $\Delta F$ be equal to the bandwidth of the carrier signal.

In another example, $f_2 = n \, 15 \times 2^\mu + F_G + f_1$ and $n = 0, 1, \ldots, n_{max}$. In this case, there is a guard band $F_G$ between the carrier and backscattered signal bandwidths. $F_G$ can be fixed, or in some embodiments, $F_G$ can be defined as a function of n for example where the guard band is not fixed. For example, due to hardware impairments, as the frequency shift is higher, a larger guard band may be defined.

As detailed above, the carrier time segment, frequency shifts, and spreading/scrambling codes define a grid of backscatter transmission opportunities, or channels. For example, with $K_1$ carrier time segments, L frequency shifts, and M spreading/scrambling codes, $N_{max} = K_1 \times M \times L$ (assuming all transmission opportunities available for backscattering, i.e., without dedicated occasions excluded from other purposes such as charging, receiving data, channel estimation, device time acquisition). These channels can be indexed from $0, \ldots, N_{max}-1$ where $N_{max}$ is the number of channels. Each backscatter device is aware of the resource grid being used, for example from some configurations received via the carrier signal, from prior knowledge, or specified some other means. The device finds/accesses its own pre-assigned channel. In one embodiment, each backscatter device has an identity referred to herein as a device ID, and a channel index is obtained that is a function of device ID. For example, a channel index may be obtained by mod(Device ID, $N_{max}$) where mod(x, y) denotes the x modulo y. As a result, each backscatter device is pre-assigned a channel index, based on device ID, and the backscatter device uses the channel index to obtain the carrier time segment, frequency shift and spreading/scrambling code as among the $N_{max}$ possibilities.

Of course, with this approach, multiple device IDs may map to the same channel index, and when two or more devices access the same channel, a backscatter collision happens. However, including spreading or scrambling can increase the number of channels and reduce the likelihood of collision and/or provide a mechanism for the receiver 304 to demodulate/decode the data.

As detailed above, in some embodiments, spreading and/or scrambling (which may be linear or non-linear) is implemented using restricted load modulation in which the alphabet of a spread/scrambled symbol sequence is restricted to the constellation symbol alphabet. Implementing spreading/scrambling sequences that limit the spread/scrambled symbols to the same alphabet as the modulation symbol alphabet does not require any modification to the load modulator; for example no additional impedances are required to implement a load modulator used for modulation and spreading/scrambling compared to an implementation of a load modulator that is used only for modulation. For example, in a QPSK constellation, the constellation symbol alphabet can be given by $$\left\{ \frac{1}{\sqrt{2}}(1+i), \frac{1}{\sqrt{2}}(-1+i), \frac{1}{\sqrt{2}}(1-i), \frac{1}{\sqrt{2}}(-1-i) \right\} \text{ where } i = \sqrt{-1}.$$

In a situation where each spreading sequence is limited to the set of $\{1, -1, i, -i\}$ (with appropriate power scaling), the alphabet of the spread sequence will also belong to the constellation symbol alphabet. This is because any constellation symbol of the original constellation symbol alphabet, multiplied by an element the spreading sequence limited to the set $\{1, -1, i, -i\}$ will still be a symbol of the original constellation symbol alphabet.

For example, $1/\sqrt{2}[1, 1]$, $1/\sqrt{2}[1, -1]$ are valid spreading sequences of length 2 in that the alphabet includes only $\{1, -1\}$ which is a subset of $\{1, -1, i, -i\}$. The symbols spread by these sequences belong to the original constellation symbol alphabet.

Similarly, symbol level scrambling can be performed where the scrambling sequence is limited/restricted such that the scrambled symbol sequence also belongs to the original constellation symbol alphabet.

In some embodiments, to achieve reduced complexity in the backscatter device, there is no specific spreading/scrambling block in the transmission chain for backscatter device. Rather, spread/scrambled sequences can directly be defined. For example, a table that shows the output of combined modulation and spreading/scrambling can be defined. In this case, the data modulation and spreading operations can be combined in a single step.

In some embodiments, sparse spreading is employed in the backscatter devices. By introducing the zero symbol to the load modulator, sparse spreading can be supported. Two examples of constellations with zero symbols are shown in FIG. 6. A 4-QAM constellation with additional zero symbol is indicated at 800, a 16 QAM constellation with additional zero symbol is indicated at 802. In each case, the zero symbol is labelled $f_0$. In a specific example of how to implement the additional zero symbol, a single high resistive impedance for generating the zero constellation point can be used, such that sequences with "0"s are possible. FIG. 5 shows an example of a load modulator with additional resistive impedance 702 to support sparse spreading. A sparsity sequence of zeros and ones can be implemented by using the resistive impedance 702 for each zero in the sparsity sequence, and using one of the other impedances 704, 706, . . . 708 for each one in the sparsity sequence. While an additional capability for the load modulator is required (the high resistive load), it is noted that if multiple modulation types are supported in the load modulator, only a single mechanism for supporting the zero symbol is needed and can be used across the different modulation types. For example, for sparsity support for 4-QAM modulation and 16-QAM modulation, the implementation of a single zero constellation point is sufficient.

As described, the restricted symbol spreading, symbol scrambling or both has low complexity and therefore can be implemented by realizable hardware such as load modulation, which is a low-cost implementation, that still provides some collision handling capability. Moreover, the hidden terminal interference at the receiver is randomized by assigning/pre-configured device specific scrambling/spreading sequences. The minimal hardware changes to include spreading/scrambling provide a flexible and low-cost approach to support linear/non-linear spreading, scrambling, and multiple spreading sequences by a single device. Introducing the zero symbol to the load modulator enables a low-cost approach to support sparse spreading which is realized by a single additional resistive impedance for all modulation schemes. While 4 impedances are needed to realize 4-QAM, to enable sparsity along with 4-QAM, 5 impedances are needed. Similarly, for 16-QAM constellation requires 16 impedances, to realize sparsity with 16-QAM constellation requires only 17 impedances.

Figure 7:
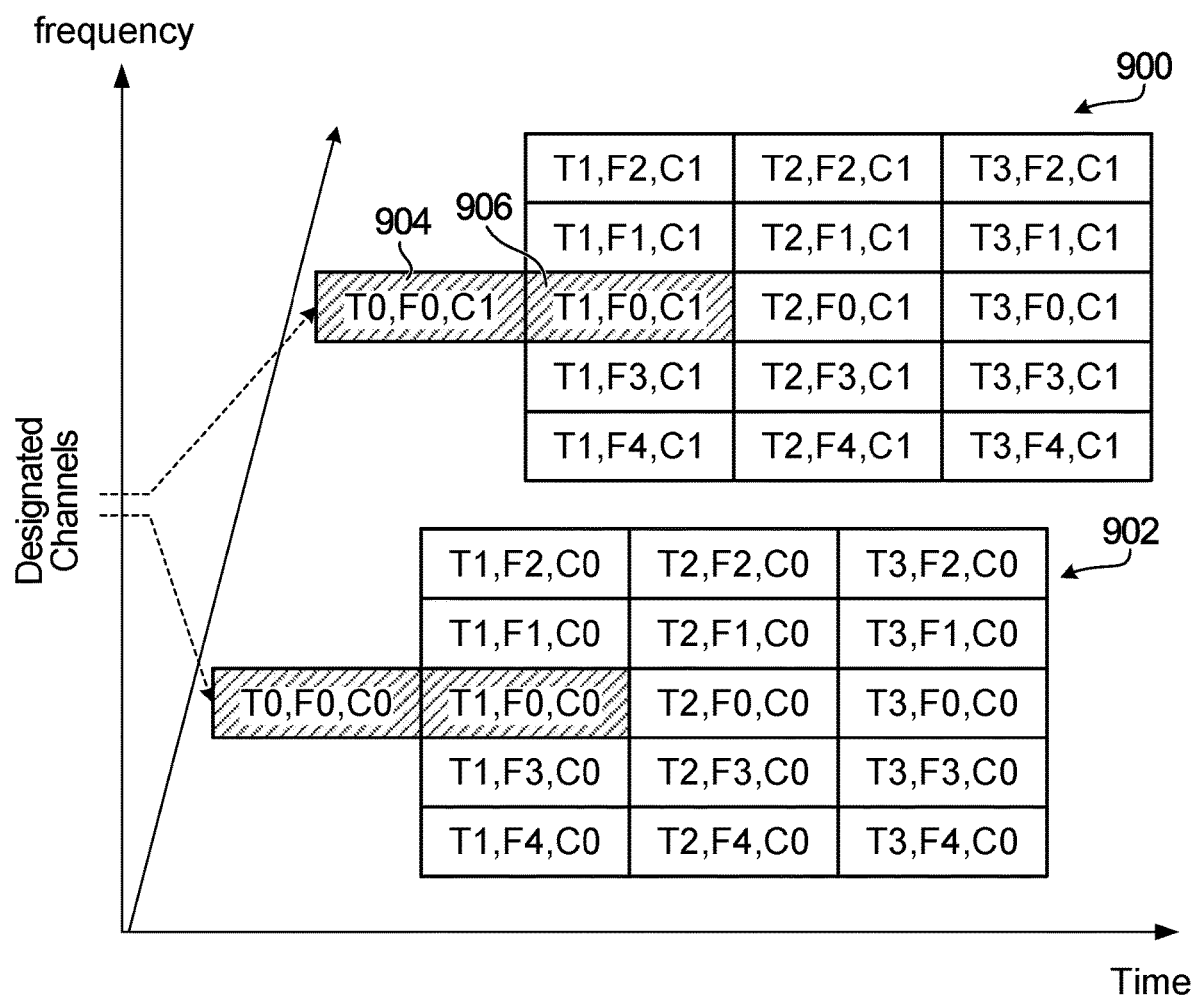
FIG. 7 is another example of a pre-assigned resource grid for backscatter multiple-access communication.

A specific resource grid example is shown in FIG. 7. In this example, sets of channels 900, 902 are shown for two spreading/scrambling codes C0 and C1. The channels within the top set 900 will be described as representative. On the original carrier frequency F0, there are two dedicated channels 904, 906 that are used for time acquisition, signaling information, receiving data and charging. The grid has four carrier time segments, or time slots, T0, T1, T2, T3, and has frequencies F1 and F2 that are greater than the carrier frequency F0, and frequencies F3 and F4 which are lower than the carrier frequency.

The backscatter device behavior during the dedicated channels 904, 906 can vary. In some configurations, a backscatter device avoids making backscatter transmissions during the dedicated channels. In this case, when the dedicated channel carries downlink data (carrier communication device to backscatter device), if all devices refrain from backscattering, this will avoid interfering with the data reception.

In some configurations, backscattering is mandatory during the dedicated channel for all devices. In a specific example, all devices backscatter the received carrier signal in the dedicated channel for purposes that may include one or more of channel estimation, synchronization, time acquisition. In some configurations, a device that is capable of backscattering while receiving downlink data backscatters using the dedicated channel, while other devices that don't have this capability refrain from backscattering using the dedicated channel.

The grid can be used to support diverse and dynamic traffic conditions as described below. In some embodiments, there may be one or more backscatter devices each of which makes its backscatter transmissions in a single channel in a situation where only a single backscattering opportunity/channel per device is defined within the carrier signal burst. For example, the index of the backscatter channel may be obtained by $\mathrm{mod}(\mathrm{UE\_ID}, N_{max})$ where $N_{max}$ is the size of resources grid and UE_ID is the device identifier.

Alternatively, or in addition, there may be one or more backscatter devices that are given multiple backscattering opportunities within a single carrier signal burst. This is referred to herein as multi-channel backscattering. For example, indices of backscatter channels per device may be obtained by $\mathrm{mod}(\mathrm{UE\_ID}+i\mathrm{floor}(N_{max}/F), N_{max})$ where F is an integer $\geq 2$ and is the minimum number of backscatter opportunities within a carrier signal burst and $i=0, \ldots, F-1$. In some embodiments, some devices backscatter in a single channel and some devices backscatter in multiple channels within a single carrier signal burst.

In some embodiments, the backscatter devices are configured to perform backscatter channel hopping. When backscatter channel hopping is configured, a backscatter device may hop a backscattering channel index (or indices for multi-channel backscattering) from one carrier signal burst to a next carrier signal burst. Each backscatter channel index is associated with one or more of frequency shift, time offset and spreading/scrambling code, such that hopping the backscattering channel index can result in a change in one or more of frequency shift, time offset, and spreading/scrambling code.

The following are some examples of restricted sparse and non-sparse spreading that may be used with the embodiments described herein:

Example 1: Two orthogonal sparse sequences based on pure resistive impedances are defined [1, 0], [0, 1]

Example 2: Two orthogonal non-sparse spreading sequences based on phase changes [1, 1], [1, −1]

Example 3: Two orthogonal non-sparse spreading sequences based on reactance impedances are defined [j,j], [j, −j]

Example 4: Modulation dependent restricted spreading/scrambling: For QPSK or 16-QAM modulations, the alphabet of spreading/scrambling sequence is restricted to {1, −1, j, −j}. Therefore, [1, 1], [1, −1] are valid spreading sequences and there are 16 such valid spreading sequences of length 2 and there are 64 such valid spreading sequences of length 4.

The following are example implementations of sparse spreading:
  Example 1: A resistive impedance (One additional resistive impedance in the load modulator to block the backscattering/signal reflection; see previous description, for example FIG. 5).
  Example 2: Device charging circuit to absorb and block the backscattering (indirect large resistive impedance to block reflection).

The following are example implementations of non-sparse spreading:
  Example 1: Select the appropriate impedance of the load modulator by appropriate control functions;
  Example 2: Generate a longer bit sequence and use the existing load modulator control functions to emulate/resemble/mimic/imitate the spreading/scrambling.

In some embodiments, backscatter devices are configured to perform sequence hopping. Such a backscatter device hops sparsity sequence, spreading sequence, scrambling sequence or a combination thereof in different backscatter channels within the same carrier signal burst. For example, where a pool of size L spreading sequences is defined, a backscatter device may be configured to use different spreading sequences from one channel use to the next (within the same burst or multiple bursts). This has the effect of randomizing the interference. In a specific example, the sequences in the pool each have a sequence index, and the sequence index to be used is determined according to mod(Device_ID+x, L) where x is the channel use index. For a given device, the channel use index x is the index to the using of the channel by the device, i.e., for single channel use, x=0, in multi-channel use scenario, x=0 for the first channel use and x=1 for the second channel use.

Figure 8:
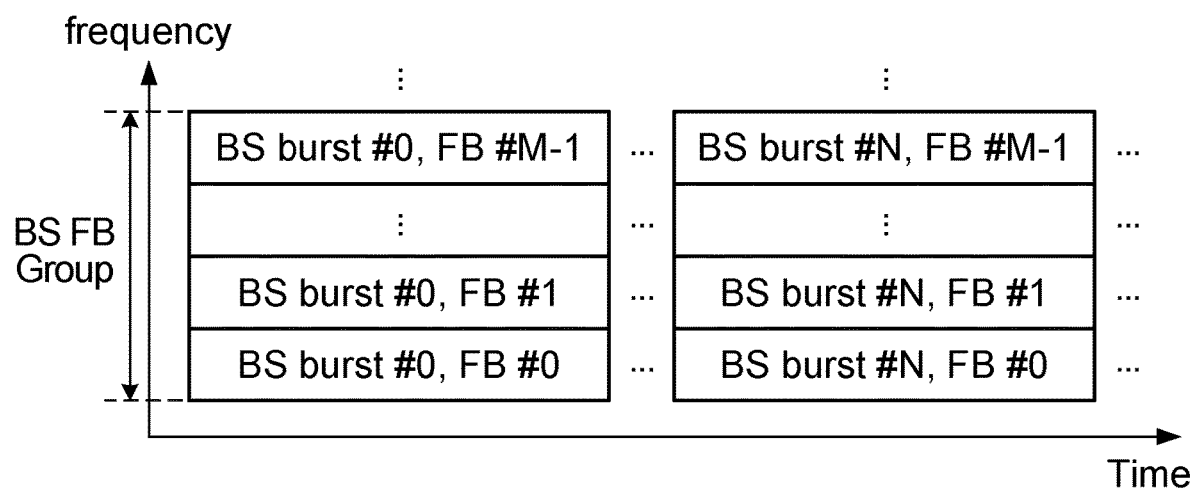
FIG. 8 shows an example of backscatter device frequency band groups.

In some embodiments, frequency resources for backscatter transmission are defined using frequency band (FB) groups. A FB group is defined herein as a group/collection of M frequency sub-bands indexed $0, \ldots, M-1$. An overall frequency range available for backscatter communication is partitioned/divided into M frequency sub-bands. A backscatter device, upon receiving a carrier from a carrier communication device in a sub-band, shifts the carrier to the pre-defined frequency sub-band as described earlier. The frequency shift can also be zero, i.e., backscattered in the same frequency as received carrier frequency without frequency shift. The purpose/motivation is that a FB group can be assigned/used per use scenario with different requirements, for example, for long/short coverage, high/low mobility, traffic load/data rates, device density etc. For example, a set of narrow sub-bands can be used for large coverage whereas a set of larger sub-bands can better mitigate channel variations in time and is suitable for a high mobility scenario. An example of a backscatter FB group is shown in FIG. 8.

Some examples of system properties based on the FB concept include:
  Example 1: FBs are equal in size, i.e., a FB group comprises equal size sub-bands;
  Example 2: a FB is a subcarrier in an OFDM resource grid and one or more of subcarrier(s) form a FB group;
  Example 3: FBs may or may not be adjacent in absolute frequency values;
  Example 4: FBs may be equally spaced in frequency.

In a specific definition:
  FB group: M sub-bands in frequency indexed $0, \ldots, M-1$ where $M \geq 1$;
  A sub-band of size $\Delta F_i$, $i=0, \ldots, M-1$ forms a FB group defined in a band of frequency $\Sigma_{i=0}^{M-1} \Delta F_i$ In one alternative, all sub-bands in a FB group are equal size, i.e., $\Delta F_i = \Delta F_j$, $i, j \in \{0, \ldots, M-1\}$, $i \neq j$. For example, a FB can be a single or multiple or fraction of subcarrier(s) in an OFDM resource grid.

In some embodiments, frequency resources for backscatter transmission are defined using FB group sets. A FB group set is a set of $N \geq 1$ FB groups indexed $0, \ldots, N-1$. FB group bandwidth can be defined according to $F_n = \Sigma_{i=0}^{M-1} \Delta F_i$, $\forall n=0, \ldots, N-1$. In one alternative, group bandwidths are equal in size, i.e., $F_n = F_m$, $n, m \in \{0, N-1\}$, $n \neq m$. In another alternative, group size are different, i.e., FB groups of frequency $F_n$ and $F_m$ with sub-bands $M_n$ and $M_m$, respectively and $M_n \neq M_m$. In another alternative, $M_n = M_m$.

In one alternative, frequency band size of different FB groups is not the same. Frequency bands have size $\Delta F_i^{(n)}$ and $\Delta F_i^{(m)}$ in FB group n and m respectively with n, $m \in \{0, N-1\}$, $n \neq m$ where $\Delta F_i^{(n)} \neq \Delta F_i^{(m)}$. In another alternative, $\Delta F_i^{(n)} = \Delta F_i^{(m)}$.

In some embodiments, subcarriers/sub-bands in an OFDM resource grid form a FB group.

In some embodiments, possible subcarrier spacings include $15 \cdot 2^\mu$ kHz, $\mu=0, 1, 2, 3, 4, 5$.

In some embodiments, possible subcarrier spacings include $15 \cdot 2^{-\mu}$ kHz, $\mu=0, 1, 2, 3, 4$.

In some embodiments, possible subcarrier spacings include 1.875, 7.5, 15, 30 kHz.

Examples of possible FB group sizes include:
  First example: $2^m$, $m=0, 1, 2, 3, 4, \ldots$.
  Second example: 2m, $m=0, 1, 2, 3, 4, \ldots$.
  Third example: FB group sizes: 2, 4, 8, 12

In some embodiments, carrier time segments for backscatter transmission are defined based on a carrier time segment set. The carrier is transmitted as carrier signal bursts separated by inter burst gaps. Each carrier signal burst has a carrier time segment set which is a set of time periods during which the carrier signal is transmitted and during which backscattering transmission opportunities exist. From the perspective of the backscatter devices, a carrier time segment that is available for backscatter transmission can be referred to as a backscatter burst (BS burst), and the set of BS bursts corresponding to a set of carrier time segments within a carrier signal burst can be referred to as a BS burst set. The BS burst set may include a subset, or all of the carrier time segments.

In a FB group, a carrier time segment set is transmitted in one or more than one FBs or a carrier time segment set is transmitted on a sub-set of FBs or FB groups. For example, if the system is capable of shifting large frequency ranges or only certain FB groups are active at a given time (system level requirement), a carrier will be actually transmitted only on those needed. On the other hand, if devices have very little or no capability of shifting frequency, all FBs need to have a carrier transmitted. BS bursts can be periodic, semi-persistent or aperiodic. An inter burst gap can be configurable, for example depending on the power saving requirement and traffic conditions.

In some embodiments, a BS burst set consists of L carrier time segments, and transmission units (TUs) and channels, align in time with these carrier time segments. Note that the carrier time segments may be equal or unequal in size (in time). In some embodiments, carrier time segments in a carrier time segment set are equal in length. This approach is suitable for uniform traffic conditions and simple design/implementation. Alternatively, carrier time segments in a carrier time segment set are not the same length.

For example, one or more TUs within the resource grid may be designated for a specific purpose such as control information and/or synchronization purposes. There may be periodic TUs for synchronization and control information.

Figure 9:
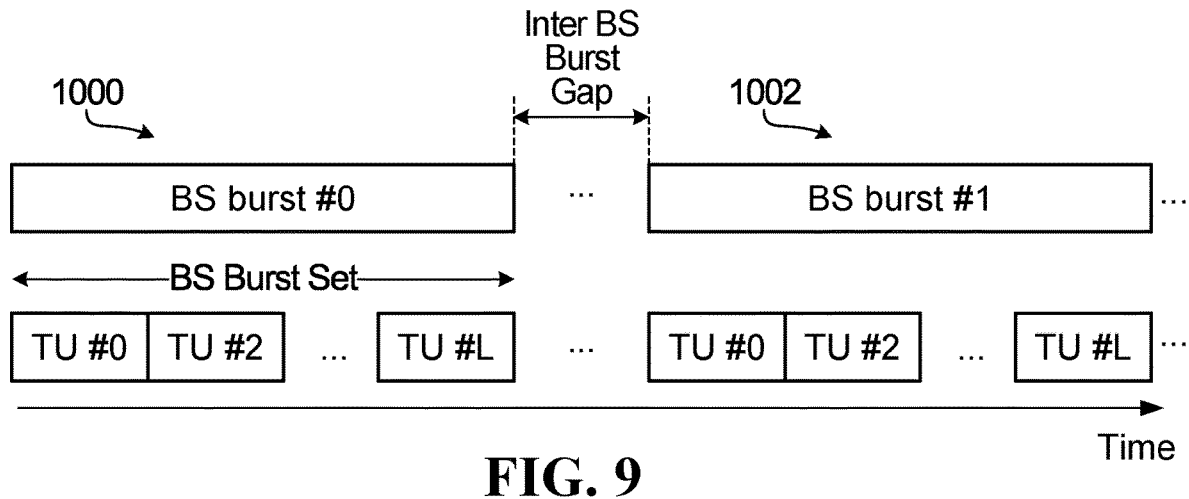
FIG. 9 shows an example of inter backscatter burst gap.

FIG. 9 shows an example of BS burst sets. Shown is a first BS signal burst 1000 composed of a BS burst set containing L TUs, and a second BS burst 1002 composed of a BS burst set containing L TUs. The two BS bursts 1000, 1002 are separated by an inter BS burst gap. FIG. 9 does not show code and frequency separation. More generally, within each carrier time segment of a BS burst set, there can be a respective TU for each frequency, spreading/scrambling permutation.

One or more burst set(s) form a burst set group where a burst set group consists of R burst sets.

Figure 10:
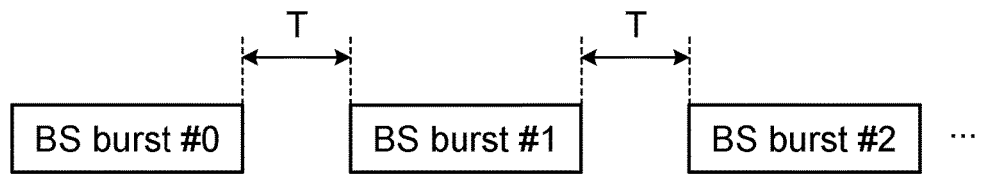
FIG. 10 shows an example of a periodic or semi-persistent burst set.
Figure 11:
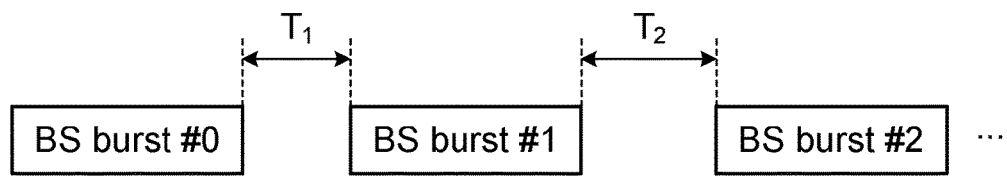
FIG. 11 shows an example of an aperiodic burst set.

In some embodiments, a BS burst set group has a type that is associated with inter burst gap as follows:

Periodic burst set: The time gap between consecutive burst sets in time is fixed and bursts are transmitted periodically. This is more suitable for bistatic/ambient backscatter systems. An example is shown in FIG. 10;

Semi-persistent burst set: The time gap between consecutive burst sets in time is fixed and a finite number of burst sets are transmitted. This is more suitable for power saving in monostatic and bistatic backscatter applications, and for interference control in ambient backscatter applications;

Aperiodic burst set: There is no pre-defined/agreed time gap between consecutive burst sets. Burst sets are self-contained. This is more suitable for power saving in monostatic and bistatic backscatter applications and interference control in ambient backscatter applications. An example is shown in FIG. 11; or Other burst set: One or more burst sets are transmitted in a pre-defined/prior agreed pattern.

In a first example of an "other burst set": the time gap between first two burst sets is $T_1$ and the time gaps of subsequent burst sets is an integer multiple/fraction of T up to a maximum of M number of burst sets ($T_i = a_i T_1$ where $i=2, \ldots, M$. In some examples, $a_i = 2^i$ or $a_i = 2^{-i}$).

In a second example of an "other burst set": The time between consecutive burst sets is tabulated. An example of inter burst gap is shown in the Table 1 below.

TABLE 1

| Tabulated inter burst gap | | |
|---|---|---|
| Type | R | Pattern |
| 1 | 3 | T, 2T, 3T |
| 2 | 4 | T, 2T, 4T, 5T |
| 3 | 2 | T, T/2 |

Advantages of differing time gaps include:
Long backscatter communication lifetime by backscatter transmitter in sleep mode;
Carrier power saving in monostatic and bistatic BS systems and controlled or reduced interference in ambient BS systems; and
The ability to support different traffic requirements.

The inter burst gap pattern may indicate/signal certain signaling information. For example, a particular pattern, say for example T, T/2 indicates that backscatter transmissions are to be repeated in subsequent bursts by the devices. This will enable the receiver to decode in a more reliable manner.

Figure 12:
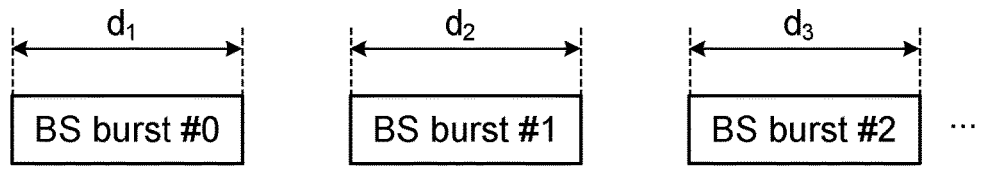
FIG. 12 shows an example of a burst set with bursts of differing durations.

A burst set group comprises R burst sets. An example is shown in FIG. 12 for R=3 and burst length pattern $d_1, d_2, d_3$.

In some embodiments, the burst sets in a burst set group have equal burst set length. In this case, the burst set length is the same in time for consecutive burst sets. For example, equal lengths $d_i = d_j$, $i, j \in \{0, \ldots, R-1\}$, $i \neq j$. In other embodiments, the burst set lengths are unequal.

In some embodiments, burst set length is customized for different traffic conditions and/or the number of devices or device density. The following is a set of examples:

Example 1: Burst set lengths are increasing, $d_i < d_j$, $i < j$ and $i, j \in \{0, \ldots, R-1\}$ Example 2: Burst set lengths are decreasing, $d_i > d_j$, $i < j$ and $i, j \in \{0, \ldots, R-1\}$ Example 3: Burst set lengths are increasing, $d_j = a_j d_1$, $j > 1$ and $j \in \{1, \ldots, R-1\}$ where $a_j = j$ Example 4: Burst set lengths are increasing, $d_j = a_j d_1$, $j > 1$ and $j \in \{1, \ldots, R-1\}$ where $a_j = 2^j$ Example 5: Burst set lengths are increasing, $d_j = a_j d_1$, $j > 1$ and $j \in \{1, \ldots, R-1\}$ where $a_j = 2^{-j}$ Example 6: Burst set lengths are provided in a table. An example format for such a table is shown in Table 2 below.

TABLE 2

| Burst Set Lengths | | |
|---|---|---|
| Type | Burst set group size R | Length pattern of the burst set group |
| 1 | 3 | d, 2d, 3d |
| 2 | 4 | d, 2d, 4d, 5d |
| 3 | 2 | d, d/2 |

The burst length pattern may indicate/signal certain signaling information. For example, a particular pattern, say for example d, 2d, 3d may be used to indicate that backscatter transmissions be repeated in subsequent bursts by the devices. This will enable the receiver to decode in a more reliable manner. Moreover, a combination of the inter burst gap pattern or burst length pattern may indicate certain signaling information. In general, the resource grid structure may indirectly/implicitly define or control the system or device behavior.

In some embodiments, multiplexing based on multiplexing groups is performed. Multiplexing groups can include:

Frequency division multiplexing (FDM) group: A set of FBs non-overlapping with other FBs in frequency is defined within a single or multiple FB groups. In a given frequency range, one or more FDM groups can be defined;

Time division multiplexing (TDM) group: A set of TUs non-overlapping with other TUs in time domain;

Code division multiplexing (CDM) group: A set of codes within a same time and frequency resource allow UE multiplexing with orthogonal code domain separation.

In some embodiments, resource sharing based on multiplexing groups is performed.

Alternative 1: A receiver specific FDM group is defined and devices communicating to the same receiver use the same FDM group. Each device uses a device specific TU; device specific TUs are separated using TDM and/or CDM.

Alternative 2: A receiver specific TDM group is defined and devices communicating to the same receiver use the same TDM group. Each device uses a device specific TU; device specific TUs are separated by FDM and/or CDM.

Alternative 3: A receiver specific CDM group is defined and devices communicating to the same receiver use the same CDM group. Each device uses a device specific TU; device specific TUs are separated by FDM and/or TDM.

Alternative 4: A receiver specific group is based on a combination of one or more of FDM, TDM, CDM and devices communicating to the same receiver use the same group.

In some embodiments, the receiver and/or the backscatter devices choose the multiplexing group. For example, multiplexing groups may be indexed from 0, . . . , G−1. The receiver and/or device may obtain the multiplexing group for CDM/FDM/TDM individually or together. The following is a set of examples:

Example 1: Multiplexing group for receiver and/or device is a function of receiver identifier such as mod(Rx_ID, G). Rx_ID is an identifier for the receiver. The device knows the Rx_ID (prior information). For example, the multiplexing group broadcasts Rx_ID information.

Example 2: Multiplexing group for receiver and/or device is a function of device identifier such as mod(Device_ID, G). Device_ID is identifier for device.

Example 3: Multiplexing group for receiver and/or device is selected by a function based on a pseudo random number. In some examples, both receiver and devices know the seed of pseudo random number generator. In a specific example, multiplexing group for receiver and/or device is obtained by mod(Device_ID+PN, G) where PN is a random number.

Example 4: Multiplexing group for receiver and/or device is selected by a function based on a pseudo random number and device specific adjustment. In some embodiments, a device obtains/selects a specific multiplexing group with an offset, for example, mod(Device_ID+Offset, G). In some embodiments, a device obtains/selects a specific multiplexing group by a pseudo random number and a device specific offset, for example, mod(Device_ID+Offset+PN, G).

Various options exist for transmitting the carrier for use in backscattering.

In one option, at a given time, a carrier for one multiplexing group is transmitted. This avoids interference to other multiplexing groups. During periods that the carrier is not being transmitted for a given multiplexing group, devices and/or the receiver of that multiplexing group can adjust for oscillator drift, make other circuit re-adjustments and/or simply use the time to cool off.

In a second option with regards to the carrier transmission, a respective carrier is simultaneously transmitted for all of the multiplexing groups. A devices can use other carrier signals (other than the specific carrier or carriers being used by the device for backscattering)) for energy harvesting, synchronization purpose etc.

Multiplexing group structure and implementation can be optimized for carrier and receiver performance enhancement.

In a first example, an FDM group has equally spaced FBs to reduce transmit power and/or to achieve peak average power ratio (PAPR) optimization. In a second example, an FDM group has non-consecutive FBs or TUs to achieve higher frequency or time diversity.

In some embodiments, devices choose TUs within a multiplexing group that is chosen or otherwise selected/assigned for a device. TUs in a multiplexing group can be indexed from 0, . . . , T−1.

In a first example: the TU(s) used for backscattering (referred to below as backscattering TU(s)) by a given device is/are a function of device identifier such as mod (Device_ID, T). Device_ID is an identifier for a device. The receiver knows the Device_ID so as to perform reception on the correct TU. Alternatively, the receiver can or perform reception/decoding in all possible TUs.

In a second example: backscattering TU(s) is/are a function of device and/or receiver identifiers such as mod (Device_ID+Rx_ID, T) or mod(Rx_ID, T).

In a third example: backscattering TU(s) is/are selected by a function based on a pseudo random number. In some examples, both receiver and devices know the seed of pseudo random number generator. For example, the index for the TU may be obtained by mod(Device_ID+PN, T) where PN is a random number.

In a fourth example: backscattering TU(s) is/are selected by a function based on a pseudo random number and a device specific adjustment. In some examples, both receiver and devices know the seed of pseudo random number generator and device uses a device specific offset.

In a fifth example: backscattering TU(s) is/are selected by a function based on a multiplexing group. In some examples, the index of the TU may be obtained by mod(Device_ID+Mux_Group_ID, T) where Mux_Group_ID is an identifier for multiplexing group.

In some embodiments, devices may backscatter in multiple TUs for higher traffic devices to enhance transmission performance. For example, the indices of backscattering TUs may be given by mod(Device_ID+i, T) where i takes more than one value. For example, i=0, 1 indicate that two TUs for backscattering.

In some embodiments, for backscatter interference randomization, a device chooses a TU based on/as a function of a random number. The seed or the generated random number can be device specific.

Figure 13:
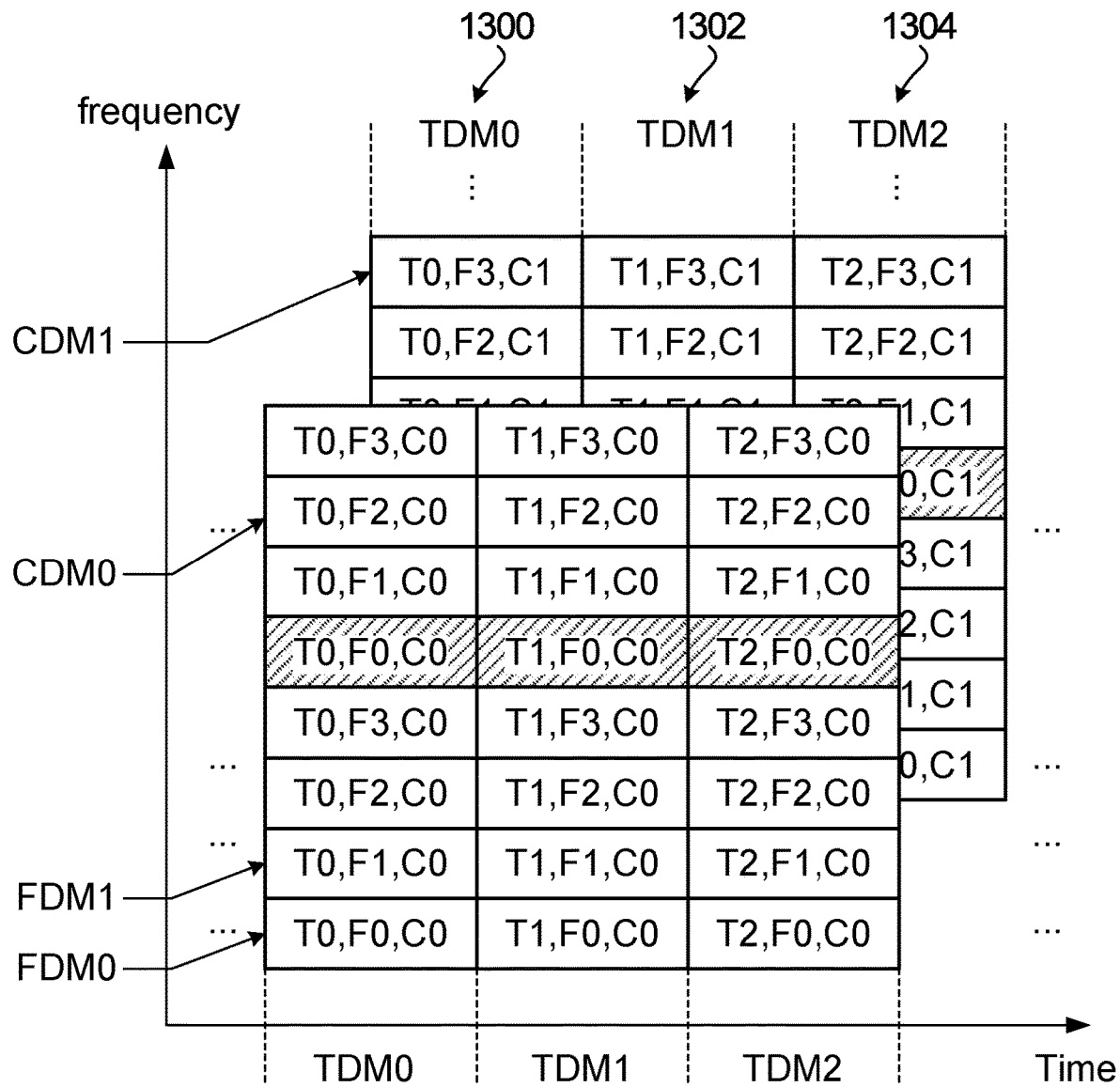
FIG. 13 is another example of a pre-assigned resource grid for backscatter multiple-access communication.

In some embodiments, receiver multiplexing occurs through TDM, and backscatter multiplexing occurs with FDM/CDM. A channel layout based on this approach is depicted in FIG. 13. In this example, different receivers use different time carrier time segments; the example of FIG. 13 shows three such carrier time segments 1300, 1302, 1304 also labelled TDM0, TDM1, TDM2 (also T0, T1 and T1 in the channel layout). With the example of FIG. 13, there are three frequency options FDM0, FDM1 and FDM2 (F0, F1 and F2 in the channel layout), and there are two spreading/scrambling code options CDM0, CDM1 (C0 and C1 in the channel layout). More generally, a similar approach can be implemented for any number of time carrier time segments, frequency options and spreading/scrambling code options.

In each time carrier time segment, certain TUs of FDM0, CDM0 and CDM1 (i.e., F0, C0/C1) are designated for channel estimation, synchronization, control information etc. In each carrier time segment, devices backscatter in TUs in FDM0, FDM1, FDM2 and CDM0, CDM1. This approach can be suitable for backscatter systems where devices perform wireless power harvesting and/or can take advantage of oscillator drift/circuit cool off time. This approach can be suitable for high data rate applications (multiple FDMs/CDMs by backscatter devices/terminals) and/or for high mobility scenarios. The specific designated TUs are only an example; different TUs may be designed in different implementations.

In another embodiment, receiver multiplexing (i.e., to which receiver the devices will backscatter) is based on FDM, and backscatter device multiplexing occurs based on a combination of FDM and CDM. With this approach, each receiver uses a specific frequency option, for example one of FDM1, FDM2, FDM3 in a situation where there are three such options. As before, TUs of FDM0, CDM0 and CDM1 (i.e., F0, C0/C1) may be designated for channel estimation, synchronization, control information etc. As before, for this approach, the number of FDM options, TDM options, and CDM options can vary from the specific example. The specific designated TUs are only an example; different TUs may be designed in different implementations.

Backscatter devices backscatter in TUs in TDM0, TDM1, TDM2 and CDM0, CDM1. If devices do not use continuous TUs in time, this scheme can be suitable for wireless power harvesting and/or oscillator drift/circuit cool off time, and can also be suitable for low mobility scenarios.

In another embodiment, receiver multiplexing is based on CDM, and backscatter device multiplexing occurs based on a combination of FDM and TDM. Different receivers use CDM0, CDM1 and devices backscatter in TUs in FDM0, FDM1, FDM2 and TDM0, TDM1, TDM3. As before, for this approach, the number of FDM options, TDM options, and CDM options can vary from the specific example.

TUs of FDM0, CDM0 and CDM1 (i.e., F0, C0/C1) may be designated for channel estimation, synchronization, control information etc. The specific designated TUs are only an example; different TUs may be designed in different implementations.

Various approaches may be used to mitigate interference due to asynchronous transmission.

In some embodiments, the carrier is OFDM based and a long CP is used to mitigate the ISI (inter symbol interference). For example, a CP that is longer than round trip delay may be used. Example configurations of the CP include:
Bistatic/Ambient: for this case, the CP is larger than the combined path delays from carrier communication device/ambient RF source to device and device to receiver;
Monostatic: for this case, the CP is larger than the round trip delay from receiver to device (round trip: receiver to device and device to receiver).

In some embodiments, backscatter gaps/guard periods are provided to mitigate interference due to asynchronous transmission. In such embodiments, backscatter devices backscatter/modulate only a portion of the carrier within a TU. The percentage of carrier used may be determined by a level of synchronization expected in the system. In a first example, guard period/backscatter gap is larger than the round trip delay. In a second example, guard period/backscatter gap is larger than a factor $\alpha$ times of the CP length.

Figure 14:
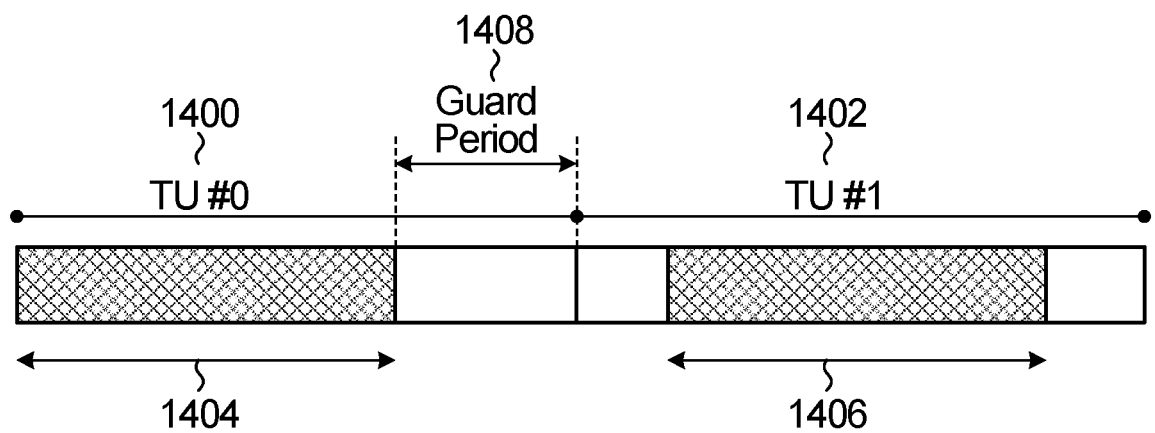
FIG. 14 shows an example of the use of a guard period to assist with interference mitigation.

An example is shown in FIG. 14. Shown are two TUs TU$\neq$0 and TU$\neq$1. Backscatter transmission takes place in a subset of time 1404, 1406 for each of the TUs, leaving a guard period 1408 between the actual backscatter transmissions.

As described previously, certain TUs may be dedicated for one or more purposes other than backscatter communication data transmission. Examples include:
TUs for channel estimation: Devices backscatter TU(s) (with known sequence) for receiver to estimate the channel;
TUs for time acquisition: Devices receive a known sequence which backscatter devices use for estimating the time and/or devices backscatter a known sequence to the receiver for the receiver to estimate round trip delay;
TUs for control information transmission: Information such as resource grid parameters are obtained by devices by receiving these TUs. Some example information includes frequency domain and time domain resource grid information, burst slot size, multi slot enable/disable, inter burst gap, sub-carrier spacing, multiplexing group related information, hopping details, receiver identity.

In some embodiments, backscatter devices find their corresponding receivers by searching for dedicated TUs. For example, dedicated TUs may be used to transmit a specific sequence that devices search to locate receivers and obtain the backscatter communication information.

Figure 15:
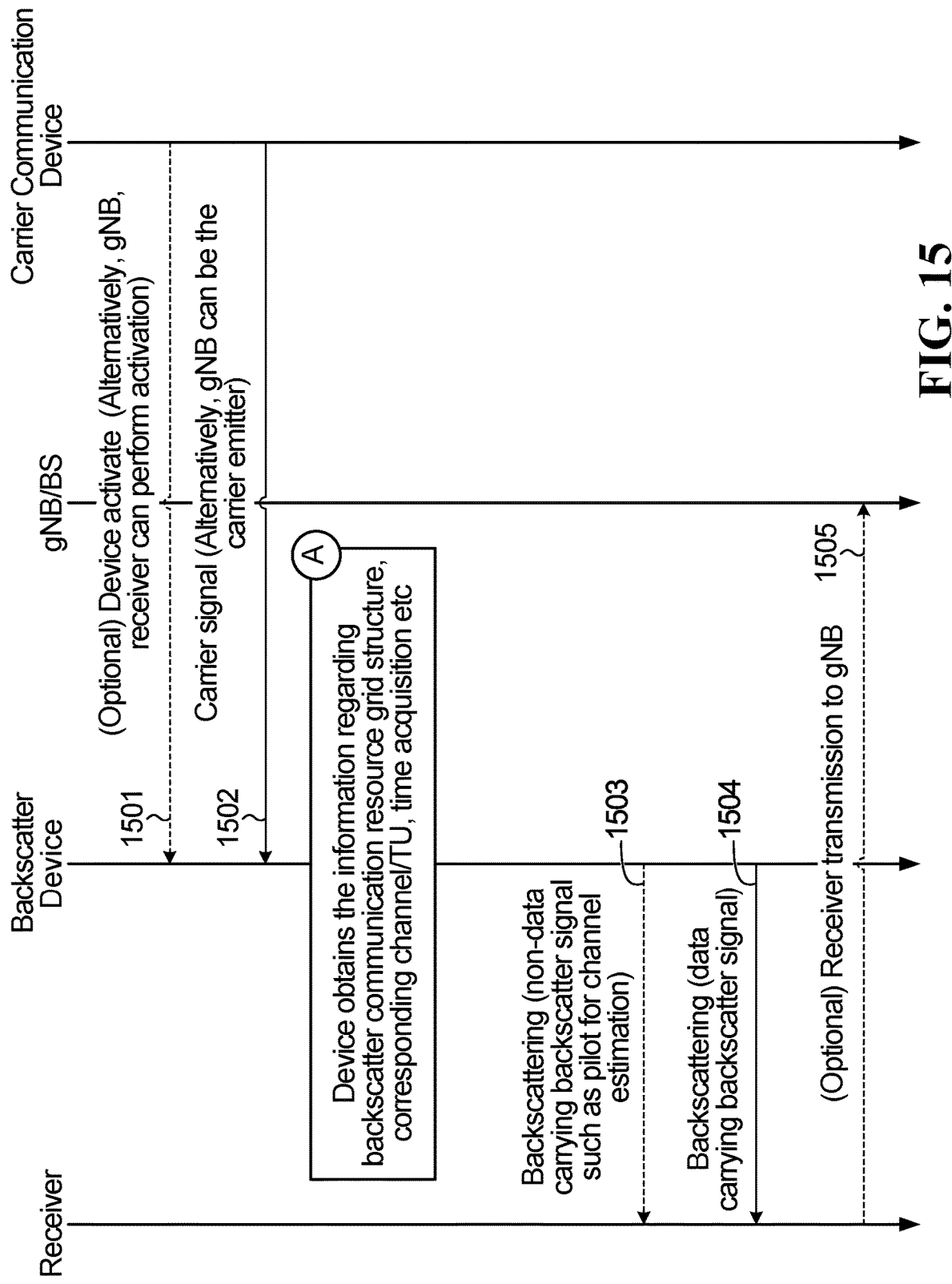
FIG. 15 is a signaling diagram for bistatic backscatter communication.

An example of signaling between different nodes in the bistatic system is given in FIG. 15. In step 1501, the backscatter device is activated. In some examples, a carrier communication device, a gNB, or a receiver may perform the activation. In some examples, the activation of the backscatter device is optional.

In step 1502, the backscatter receives a carrier signal. The carrier signal may be transmitted from a carrier communication device, which could be the carrier communication device. Alternatively, the carrier communication device may be a gNB transmitting the carrier signal. The carrier signal can be received by the backscatter device before or after the activation of the backscatter device.

In Process A, the backscatter device obtains the information regarding the backscatter communication resource grid structure, corresponding channel or TU, time acquisition etc. based on details of above embodiments. The details regarding backscattering opportunity of the backscatter device may be provided.

In step 1503, optionally, the backscatter device transmits to a receiver backscatter signal that carries a non-data component, for example, a pilot for channel estimation.

In step 1504, the backscatter device transmits a backscatter signal that carries data to the receiver.

In step 1505, optionally, the receiver may transmit signals to the gNB.

Figure 16:
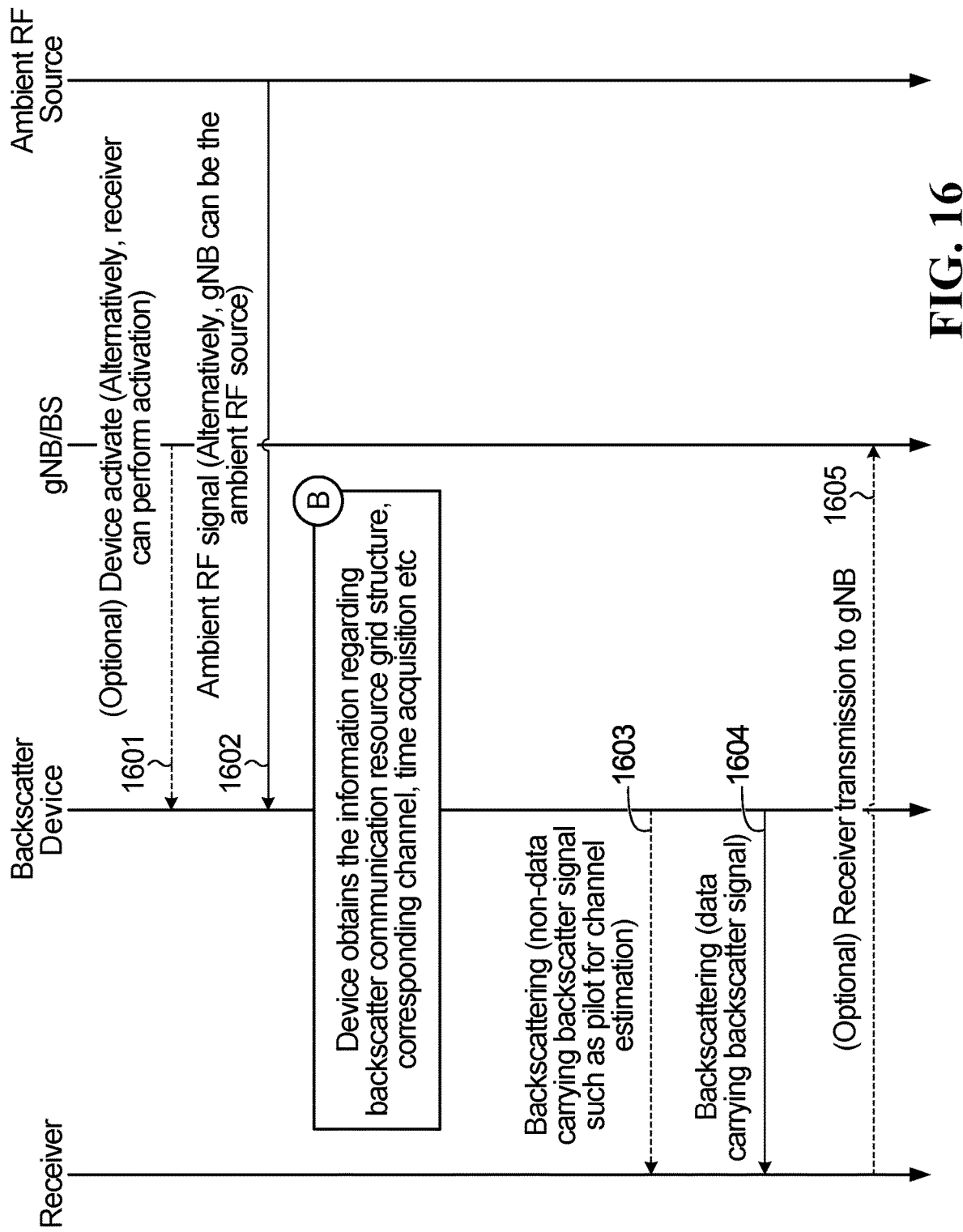
FIG. 16 is a signaling diagram for ambient backscatter communication.

An example of signaling between different nodes in an ambient backscatter system is given in the FIG. 16. In step 1601, the backscatter device is activated. In some examples, a carrier communication device, a gNB, or a receiver may perform the activation. In some examples, the activation of the backscatter device is optional.

In step 1602, the backscatter device receives Ambient RF signal from an ambient RF source. Alternatively, gNB may be the ambient RF source. It is noted that the ambient RF signal can be received by the backscatter device before or after the activation of the backscatter device.

In Process B, the backscatter device obtains the information regarding the backscatter communication resource grid structure, corresponding channel, time acquisition etc. based on details of above embodiments. The details regarding opportunity, channel, occasion, or TU for backscattering of the backscatter device may be provided.

In step 1603, optionally, the backscatter device transmits to a receiver backscatter signal that carries non-data, for example, a pilot for channel estimation.

In step 1604, the backscatter device transmits backscatter signal that carries data to the receiver.

In step 1605, optionally, the receiver may transmit signals to the gNB.

Figure 17:
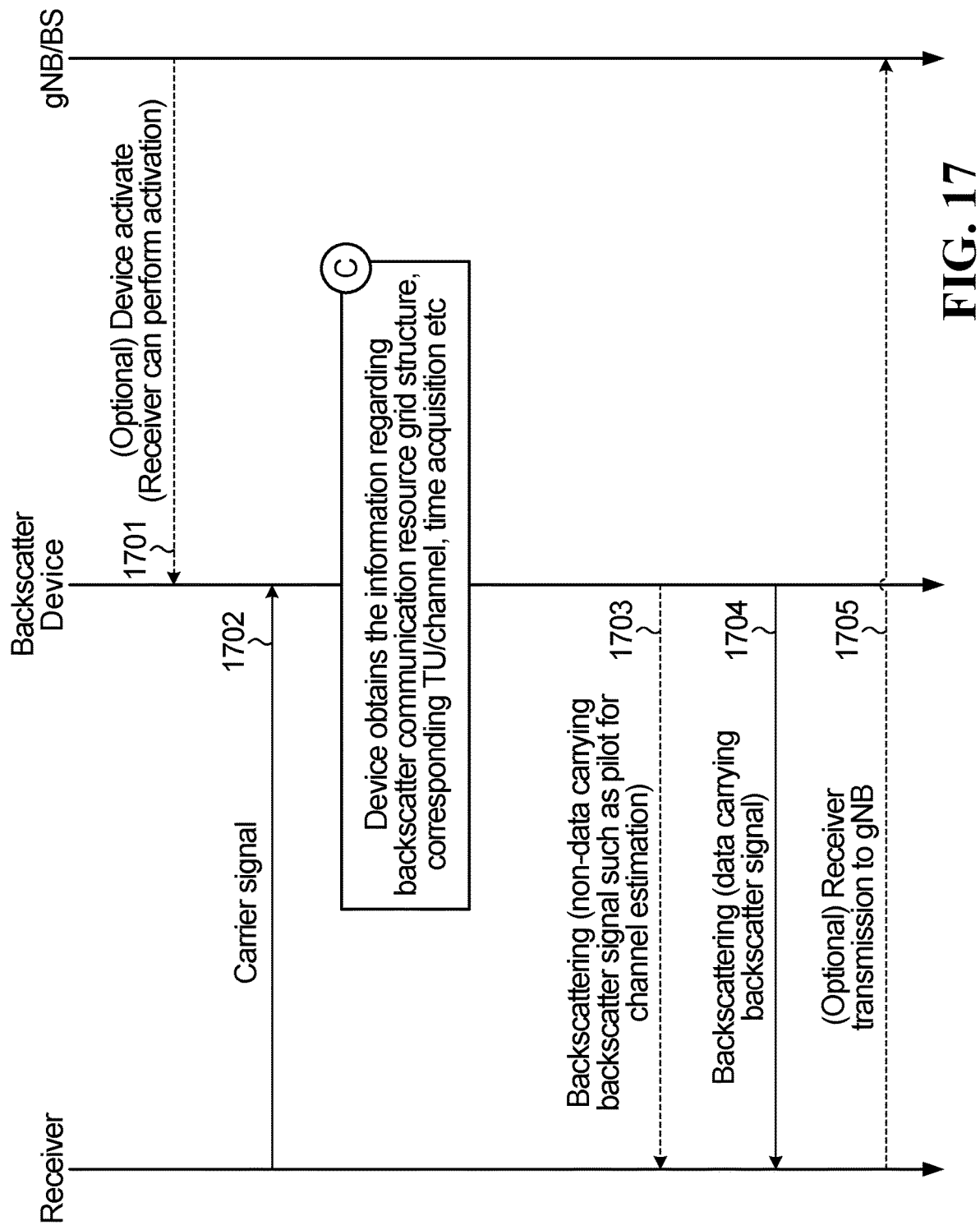
FIG. 17 is a signaling diagram for monostatic backscatter communication.

An example of signaling between different nodes in the monostatic backscatter system is given in FIG. 17. In step 1701, the backscatter device is activated. In some examples, gNB, receiver may perform the activation. In some examples, the activation of the backscatter device is optional.

In step 1702, the backscatter receives a carrier signal from a carrier communication device. The carrier signal can be received by the backscatter device before or after the activation of the backscatter device.

In Process C, the backscatter device obtains the information regarding the backscatter communication resource grid structure, corresponding TU, channel, or time acquisition etc. based on details of above embodiments. The details regarding backscattering opportunity of the backscatter device may be provided.

In step 1703, optionally, the backscatter device transmits to a receiver backscatter signal that carries non-data, for example, a pilot for channel estimation.

In step 1704, the backscatter device transmits backscatter signal that carries data to the receiver. In this example, the receiver is the same device of the carrier communication device.

In step 1705, optionally, the receiver may transmit signals to the gNB.

The proposed schemes have wide applications. For example, they can be used by wearable devices, as a part of NR/LTE UE, machines (smart home), sensors in farm and industrial settings, IoT devices, side link communication.

The backscatter device can be within a UE, or can be a wearable device such as smart watch, pet tabs, attaching device such as bag tag. The device could be integrated to a sensor device or smart home equipment (refrigerator, washer, door opener, camera etc.).

A backscatter receiver can be a UE, wearable device such as smart watch, base station etc. to name a few specific examples.

Numerous modifications and variations of the present disclosure are possible in light of the above teachings. It is therefore to be understood that within the scope of the appended claims, the disclosure may be practiced otherwise than as specifically described herein.

The invention claimed is:

1. A method comprising:
a backscatter device receiving a carrier signal from a carrier communication device, the carrier signal having a start time;
the backscatter device producing a backscatter carrier signal from the received carrier signal;
at a time offset relative to the start time, the backscatter device generating a backscattered signal by modulating data using the backscatter carrier signal and transmitting the backscattered signal using a transmission resource; and
wherein the time offset is predefined and at least in part defines a time segment of the transmission resource.

2. The method of claim 1 wherein:
the backscatter device producing a backscatter carrier signal from the received carrier signal comprises applying a frequency shift to the received carrier signal, the frequency shift being one of a set of possible frequency shifts, the set of possible frequency shifts including a zero frequency shift;
wherein the frequency shift is predefined and at least in part defines the transmission resource.

3. The method of claim 1 wherein:
modulating data comprises performing load modulation.

4. The method of claim 2 wherein generating the backscattered signal comprises:
performing scrambling of symbols output by said modulating data using a scrambling sequence, wherein a symbol alphabet of symbols output by scrambling is the same as a symbol alphabet of symbols output of said modulating data,
wherein the scrambling sequence is predefined and at least in part defines the transmission resource to be used by the backscatter device.

5. The method of claim 4 wherein said modulating data and said scrambling are performed in a single step using a load modulator.

6. The method of claim 2 wherein generating the backscattered signal comprises:
performing spreading of symbols output by said modulating data using a spreading sequence, wherein a symbol alphabet of symbols output by spreading is the same as a symbol alphabet of symbols output by modulating data,
wherein the spreading sequence is predefined and at least in part defines the transmission resource.

7. The method of claim 6 wherein said modulating and said spreading are performed in a single step using a load modulator.

8. The method of claim 3 further comprising:
the backscatter device using a resistive impedance in the load modulation to generate a zero output to achieve sparse spreading in the output of load modulation.

9. The method of claim 1 further comprising:
the backscatter device performing charging of a battery of the backscatter device using the received carrier during a time that does not overlap with the time segment of the transmission resource.

10. The method of claim 1 further comprising:
the backscatter device performing data reception using the received carrier during a time that does not overlap with the time segment of the transmission resource.

11. An apparatus comprising:
a processor and a memory, the apparatus configured to implement a method comprising:
receiving a carrier signal from a carrier communication device, the carrier signal having a start time;
producing a backscatter carrier signal from the received carrier signal;
at a time offset relative to the start time, generating a backscattered signal by modulating data using the backscatter carrier signal, and transmitting the backscattered signal using a transmission resource;
wherein the time offset is predefined and at least in part defines a time segment of the transmission resource.

12. The apparatus of claim 11 wherein:
producing a backscatter carrier signal from the received carrier signal comprises applying a frequency shift to the received carrier signal, the frequency shift being one of a set of possible frequency shifts, the set of possible frequency shifts including a zero frequency shift;
wherein the frequency shift is predefined and at least in part defines the transmission resource.

13. The apparatus of claim 11 comprising a load modulator, wherein said modulating the data is performed using the load modulator.

14. The apparatus of claim 12 wherein generating the backscattered signal comprises:
performing scrambling of symbols output by said modulating data using a scrambling sequence, wherein a symbol alphabet of symbols output by scrambling is the same as a symbol alphabet of symbols output of said modulating data,
wherein the scrambling sequence is predefined and at least in part defines the transmission resource to be used by the apparatus.

15. The apparatus of claim 14 further comprising a load modulator, wherein said modulating data and said scrambling are performed in a single step using the load modulator.

16. The apparatus of claim 12 wherein generating the backscattered signal comprises:
- performing spreading of symbols output by said modulating data using a spreading sequence, wherein a symbol alphabet of symbols output by spreading is the same as a symbol alphabet of symbols output by modulating data,
- wherein the spreading sequence is predefined and at least in part defines the transmission resource.

17. The apparatus of claim 16 further comprising a load modulator, wherein said modulating and said spreading are performed in a single step using the load modulator.

18. The apparatus of claim 13, further configured to:
- perform sparse spreading by using a resistive impedance in the load modulation to generate a zero output to achieve sparse spreading in the output of the load modulator.

19. The apparatus of claim 11 further configured to:
- perform charging of a battery of the apparatus using the received carrier during a time that does not overlap with the time segment of the transmission resource.

20. The apparatus of claim 11 further configured to:
- perform data reception using the received carrier during a time that does not overlap with the time segment of the transmission resource.

* * * * *